United States Patent [19]

Parad

[11] Patent Number: 5,369,570
[45] Date of Patent: Nov. 29, 1994

[54] METHOD AND SYSTEM FOR CONTINUOUS INTEGRATED RESOURCE MANAGEMENT

[76] Inventor: Harvey A. Parad, 36 Tirrell Crescent, Newton, Mass. 02167

[21] Appl. No.: 792,360

[22] Filed: Nov. 14, 1991

[51] Int. Cl.⁵ .............................................. G06F 15/21
[52] U.S. Cl. .................................. 364/401; 364/402; 364/468
[58] Field of Search ............................... 364/401–403, 364/468; 395/925, 926

[56] References Cited

U.S. PATENT DOCUMENTS

| | | | |
|---|---|---|---|
| 4,744,028 | 5/1988 | Karmarkar | 364/402 |
| 4,807,108 | 2/1989 | Ben-Arieh et al. | 364/468 |
| 4,866,628 | 9/1989 | Natarajan | 364/403 |
| 5,119,318 | 6/1992 | Paradies et al. | 364/468 |
| 5,260,868 | 11/1993 | Gupta et al. | 364/402 |

OTHER PUBLICATIONS

Just–In–Time Seminar Proceedings: Jul. 24–26, 1989, Washington, D.C. "A New Planning Methodology for JIT Manufacturing", Harvey A. Parad (227–230).

*Primary Examiner*—Robert A. Weinhardt
*Attorney, Agent, or Firm*—George W. Neuner

[57] ABSTRACT

A method for continuous real-time management of heterogeneous interdependent resources is described. The method preferably comprises using multiple distributed resource engines to maintain timely and precise schedules, and action controls, and identifying and responding to rapidly changing conditions in accord with predetermined requirements, relationships, and constraints. Each resource engine continuously adjusts schedules in response to changing status, resource requirements, relationships and constraints. Each action control maintains an ordered list of conditions requiring action, determines the best action in each case, and generates appropriate responses. Preferably methods for continuous operation include inquiring about status concurrent with scheduling activity and recognizing the effects of time passage on the condition of schedules.

12 Claims, 24 Drawing Sheets

FIG. 15
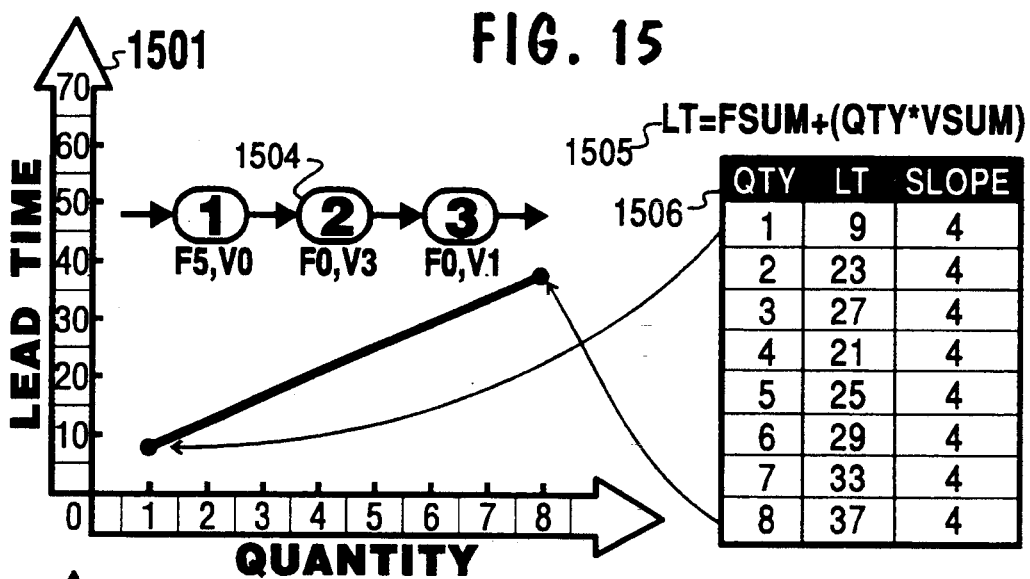
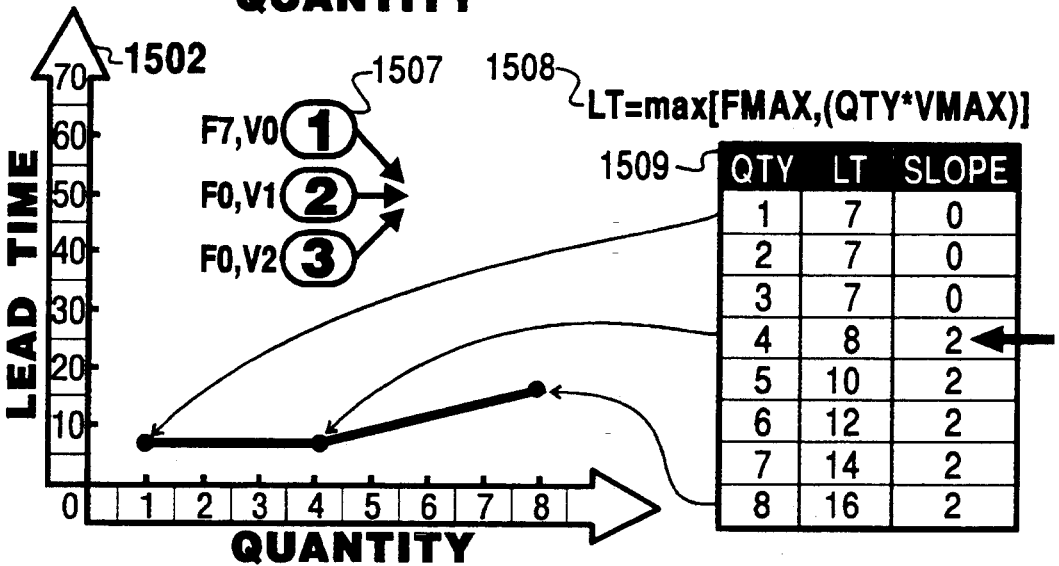
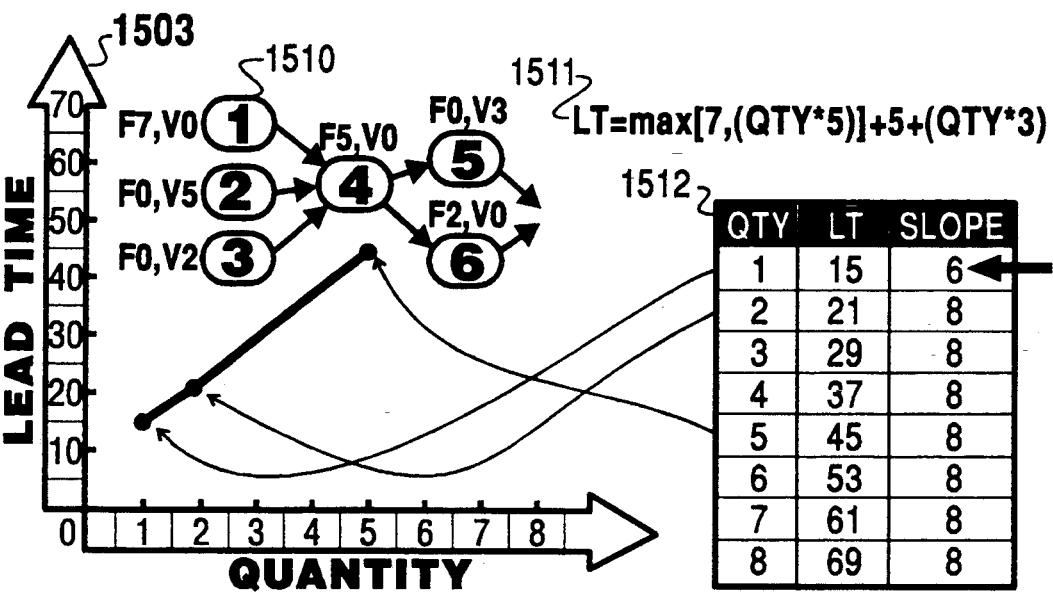

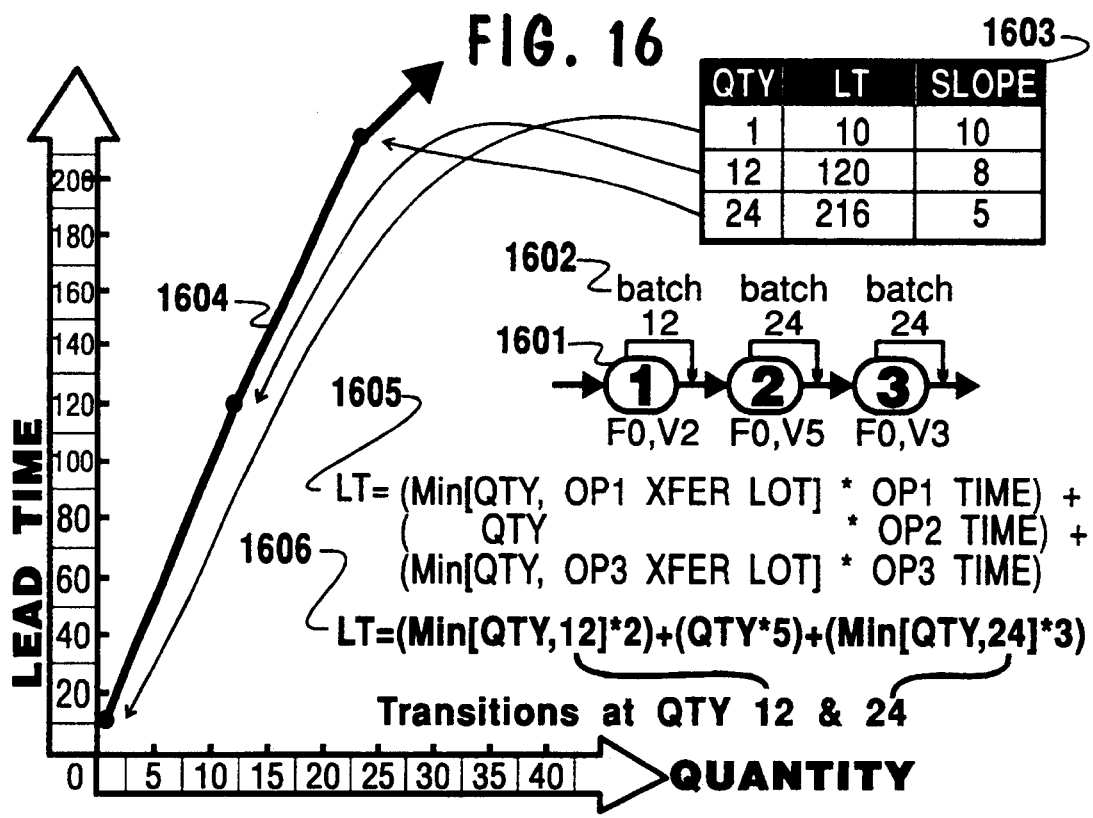
Lead Time for overlapping operations is the sum of the total elapsed time at the limiting (bottleneck) operation for the entire quantity, plus the elapsed times of all other operations for their transfer lot qty.
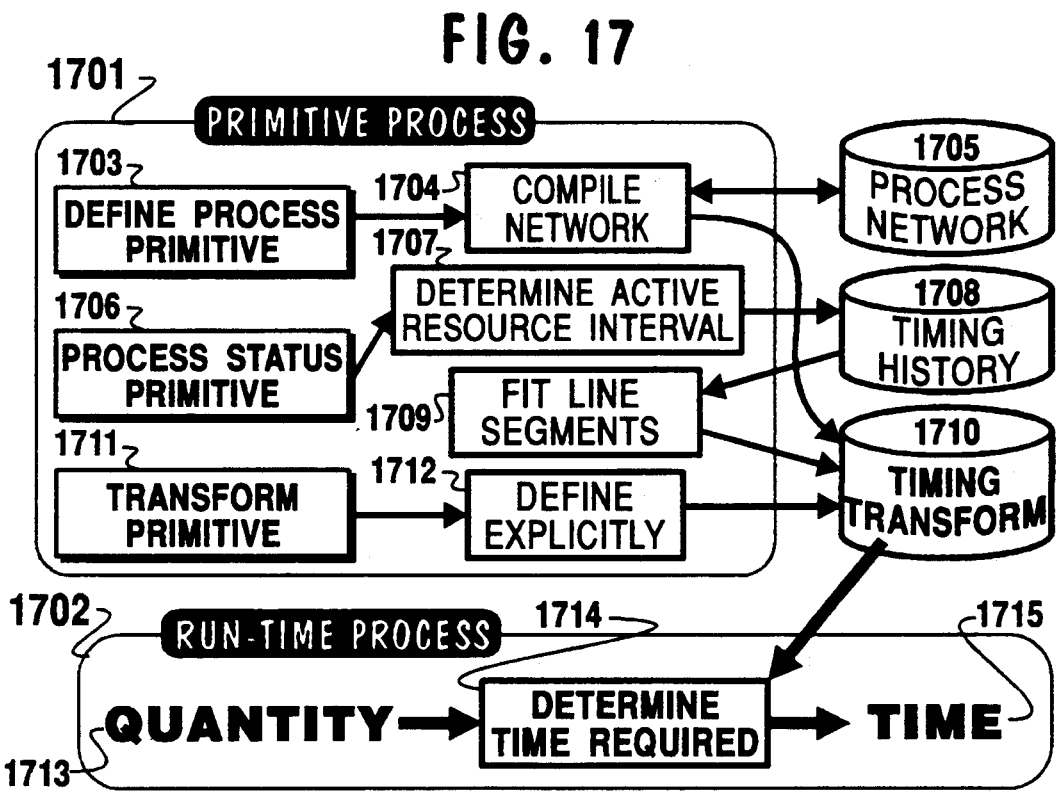

FIG.20

START-UP PSEUDO CODE

1. VALIDATE RESOURCE DATABASE
   1. OPEN RESOURCE DATABASE
   2. READ SYSTEM CONTROL BLOCK
   3. EVALUATE SYSTEM START-UP PARAMETERS (Table sizes, etc.)
      IF INVALID PARAMETERS DESCRIBE ERRORS & QUIT 2. EVALUATE SHUT-DOWN STATE
   1. OPEN AUDIT TRAIL STREAM POSITIONED AT END
   2. READ LAST ENTRY
   3. ┌─IF LAST ENTRY INDICATES ABNORMAL TERMINATION
      └─THEN SET DEMAND EVENT VERIFICATION "ON"
   4. OPEN AUDIT STREAM IN APPEND MODE 3. INITIALIZE ALL TEMPORARY TABLES
   1. USE TRIGGER TABLE INTERVAL/RESOLUTION START-UP
        PARAMETERS TO DETERMINE SIZE OF TRIGGER TABLE 703,
        AND RID LIST TABLE 704
   2. ESTABLISH TRIGGER BASE DATE FROM PRESENT DATE/TIME
   3. ALLOCATE SPACE FOR EACH TABLE 701,
        702, 703, 704, 705, 706, 707, AND 708
      ┌─IF INSUFFICIENT SPACE
      └─THEN DESCRIBE PROBLEM & QUIT
   4. INITIALIZE ALL TABLE COUNTS TO ZERO
   5. INITIALIZE LEVEL TABLE 702 VALUES TO ALL ZEROS
   6. INITIALIZE TABLE 701 FOR INDEX METHOD USED
   7. ALLOCATE & INITIALIZE DEPENDENT AMOUNT FORMULAS 4. INITIALIZE RESOURCE TABLE 705 AND INDEX 701
   ┌─FOR EACH RESOURCE IN DATABASE
   │  1. RETRIEVE RESOURCE DATA TABLES
   │  2. PUT CURRENT LEVEL & USER IN 705, SET OTHER VALUES TO ZERO
   │  3. USE EXTERNAL KEY VALUE TO BUILD ENTRY IN INDEX 701
   │  4. VALIDATE RESOURCE TABLE FORMAT
   │  5. IF EVENT VERIFICATION IS "ON" and
   │       IF RESOURCE HAS ANY SUPPLY EVENTS
   │         1. CREATE EVENT CHANGES IN 706/708 FOR SUPPLY EVENTS
   │         2. ┌─FOR EACH DEPENDENT RESOURCE
   │            │  CREATE DEPENDENT VERIFY TRANSACTION
   │            └─NEXT DEPENDENT RESOURCE
   │
   └─NEXT RESOURCE

5. OPEN COMMAND PRIMITIVE INPUT STREAM

FIG. 21

PROCESSING CYCLES

```
┌─FOR EACH PROCESSING CYCLE
│  1. IF NO COMMAND PRIMITIVES IN INPUT STREAM
│     THEN
│        1. WAIT n SECONDS AS SPECIFIED IN START-UP PARAMETERS
├────────2. PROCEED WITH NEXT CYCLE
│
│  3. PROCESS ALL ACTIVE LEVELS
│     ┌─FOR LEVEL 1 TO n (As detetmined by parameter)
│     │   ┌─IF COUNT IS ZERO
│  <═══╪══╪═THEN SKIP THIS LEVEL
│     │   └─ELSE
│     │       1.  ┌─IF COMMAND PRIMITIVES IN INPUT STREAM
│     │           └─THEN LOAD & PROCESS PER FIG. 28
│     │       2. CONSIDER TIME PASSAGE
│     │          IF SYSTEM DATE > PREVIOUS
│     │            1. COMPUTE NEW TRIGGER TABLE 703 POINTER
│     │            2.  ┌─FOR TRIGGER 703 ENTRIES FROM OLD TO NEW POSITION
│     │                │   ┌─IF ENTRY NON-ZERO
│     │                │   └─THEN REFERENCE RID TABLE 704
│     │                │         ┌─FOR EACH RID TABLE ENTRY IN LIST
│     │                │         │   ┌─IF RESOURCE TABLE 705 PREV & NEXT ZERO
│     │                │         │   └─THEN ADD RESOURCE LEVEL'S LIST
│     │                │         └─NEXT RID TABLE ENTRY
│     │                └─NEXT TRIGGER TABLE ENTRY
│     │       3. PROCESS ACTIVE RESOURCES AT THIS LEVEL
│     │          ┌─FOR EACH RESOURCE IN LIST
│     │          │   1. PROCESS RESOURCE PER FIG.22
│     │          │   2. RESET RESOURCE TABLE COUNT 715,PREV&NEXT 718
│     │          └─NEXT RESOURCE
│     │       3. UPDATE AUDIT HISTORY TABLE
│     │       4. RESET COUNT 710, FIRST 711 & LAST 712 TO ZERO
│     │
│     └─NEXT LEVEL
│
└─NEXT CYCLE
```

FIG.22

PROCESS ONE RESOURCE

1. INITIALIZE
   1. SET NEW TRIGGER VALUE TO ZERO
   2. SET RESOURCE UPDATE DATE/TIME TO SYSTEM DATE/TIME
   3. VERIFY & COMPUTE RESOURCE TABLE POINTERS
   4. RESET TOTALS, DURATION, BORROW BALANCE, RESOURCE BALANCE
   5. RESET EVENT TYPE COUNTS & TOTALS
      ┌─FOR TYPE 1 TO n
      │   1. SET ERRORS TO ZERO
      │   2. SET EVENT COUNT TO ZERO
      │   3. SET AMOUNT TOTAL TO ZERO
      └─NEXT TYPE
   6. COPY EVENTS TO WORK AREA
   7. INITIALIZE POINTER LISTS
      1. DEMAND EVENTS LIST
      2. SUPPLY EVENTS LIST

2. PROCESS UPDATE TRANSACTIONS
   1. CHANGE ANY RULES
   2. CHANGE ANY DEMAND EVENTS
      1. GET FIRST CHANGE TRANSACTION POINTER 719
      2. ┌─FOR CHANGE TRANSACTION LIST IN TABLE 707
         │   1. GET DEPENDENT RELATIONSHIP INFORMATION
         │   2. GET POINTER TO EVENT CHANGE TABLE/HEADER 706/708
         │      1. VALIDATE TABLE 708 REF. TO PARENT RID
         │      2. ┌─FOR TABLE 706 ENTRY 1 TO n
         │         │    1. COMBINE DEPENDENT RELATIONSHIP
         │         │       WITH PARENT SUPPLY CHANGE TO
         │         │       DETERMINE DEMAND CHANGE
         │         │
         │         └─NEXT TABLE 706 ENTRY
         │
         └─NEXT CHANGE TRANSACTION IN LINKED LIST

3. BALANCE SUPPLY & DEMAND PER FIG.23

4. CHANGE/ADD/DELETE SUPPLY EVENTS TO SUPPLY INDEX
   IF ANY SUPPLY CHANGE
   THEN
   1. CREATE EVENT CHANGE TABLE HEADER 708
   2. ┌─FOR EACH SUPPLY EVENT CHANGE
      │    CREATE EVENT CHANGE DESCRIPTION 706
      └─NEXT SUPPLY EVENT CHANGE

5. CREATE DEPENDENT CHANGE TRANSACTIONS
   IF ANY SUPPLY CHANGE
   ┌─FOR DEPENDENT RESOURCE 1 TO n
   │   1. CREATE DEMAND CHANGE TRANSACTION 707
   │   2. ┌─IF DEPENDENT LEVEL 716 <= PARENT LEVEL 716
   │      └─THEN PERFORM LEVEL MAINTENANCE
   │          1. ┌─IF DEPENDENT RESOURCE POINTERS 718 NON-ZERO
   │             └─THEN REMOVE DEPENDENT RESOURCE FROM LEVEL
   │          2. CHANGE DEPENDENT LEVEL VALUE TO PARENT VALUE+1
   │          3. ADD TO NEW LEVEL'S LIST BY LINKING POINTERS 718
   └─NEXT DEPENDENT RESOURCE

FIG. 23

BALANCE SUPPLY & DEMAND

1. INITIALIZE
    1. SET SUPPLY INTERVAL START TO ZERO
    2. SET SUPPLY INTERVAL TO VALUE IN CURRENT CALENDAR
    3. SET SUPPLY INTERVAL AMOUNT TO ZERO
    4. SET SUPPLY EVENT CHANGE COUNT TO ZERO

2. ─FOR ALL EVENTS
    1. IF SUPPLY EVENT THEN SKIP
    2. IF FIRST DEMAND EVENT
       THEN SET SUPPLY INTERVAL START USING CALENDAR
    3. IF EVENT TYPE IS OPEN OR FIRM SUPPLY
       THEN
         1. SUBTRACT EVENT AMOUNT (qty) FROM BORROW AMOUNT
         2. IF EVENT OVERDUE
            THEN
              1. ADJUST TRIGGER DATE
              2. COLLECT CONDITION STATISTICS 4. IF EVENT AFTER CURRENT SUPPLY INTERVAL
       THEN
         1. IF EXCESS AMOUNT
            THEN CHANGE TRIGGER & STATUS AS REQUIRED
         2. IF SHORTAGE
            THEN
              1. UPDATE TRIGGER & STATUS AS REQUIRED
              2. ATTEMPT TO BORROW FROM FUTURE OPEN/FIRM
         3. CREATE OR ADJUST A PREVIOUSLY CREATED SUPPLY EVENT
              1. APPLY AMOUNT RULES
              2. APPLY TIMING (Lead Time) RULES
                 IF FIXED LEAD TIME SPECIFIED
                 THEN USE IT
                 ELSE USE TIMING TRANSFORM PER FIG.25
              3. USE CALENDAR TO FIND AVAILABLE TIME
              4. IF AVAILABLE RESOURCE EXCEEDS MAXIMUM
                 THEN USE CALENDAR TO SHIFT EVEN EARLIER
              5. ADD EVENT CHANGE ENTRY
              6. RESET SUPPLY INTERVAL TOTALS
              7. USE CALENDAR TO SET NEW INTERVAL START
              8. IF RESOURCE TYPE IS A "RATE"
                 THEN UNLOAD WORK CARRY OVER
    5. ACCUMULATE SEGMENT TOTALS
         1. IF NO EVENT DURATION (NO RATE)
            THEN ADD CURRENT EVENT AMOUNT TO
                    SUPPLY INTERVAL AMOUNT
            ELSE APPLY & CARRY FORWARD AMOUNT AS REQUIRED

─NEXT EVENT

FIG.24

DETERMINE DEPENDENT AMOUNT

PART #1 - During Command Primitive Processing

DETERMINE FACTOR AND METHOD CODE
1. SET FACTOR & METHOD TO INTEGER ZERO
2. ┌─IF FACTOR DEFINED
   │ ├─THEN
   │ │  ┌─IF FACTOR IS AN INTEGER
   │ │  ├─THEN
   │ │  │  ┌─IF FACTOR IS 1
   │ │  │  ├─THEN USE METHOD #0 (Integer Assignment)
   │ │  │  └─ELSE
   │ │  │       USE DEFAULT INTEGER ROUNDING METHOD #
   │ │  └─ELSE
   │ │       USE DEFAULT FLOATING POINT ROUNGING METHOD #
   │ └─ELSE
   │    ┌─IF FORMULA DEFINED
   │    └─THEN PROVIDE FACTORS TO FORMULA AS REQUIRED

PART #2 - At run-time

GET DEPENDENT AMOUNT (DA) FROM PARENT AMOUNT (PA)
IF METHOD IS 0 THEN DA = PA          (Integer value assignment)
IF METHOD IS 1 THEN DA = PA * FACTOR  (Integer multiply only)
IF METHOD IS 2 THEN DA = int (float(PA) * float FACTOR + 0.5)
 (Convert PA to floating point, multiply, round-up, convert to int)
IF METHOD IS 3 THEN DA = higher int (float(PA) * float FACTOR)
 (Convert PA to floating point, multiply, round up to higher int)
IF METHOD IS 4 THEN DA = FACTOR       (factor IS DESIRED DA)
..........Unlimited definitions possible..........

FIG.25

DETERMINE DEPENDENT TIMING

```
  ┌─IF TRANSFORM POINT COUNT = 0
  ├─THEN
<═══LT = 0
  └─ELSE
     ┌─IF POINT #1 AMOUNT = 0
     ├─THEN
<════LT = POINT #1 LT   (Fixed lead time specified)
     └─ELSE
        ┌─IF AMOUNT < POINT #1 AMOUNT OR POINT COUNT IS 1
        ├─THEN
<═══════LT = (AMOUNT * POINT #1 LT) / POINT #1 AMOUNT
        └─ELSE
           ┌─FOR POINT 2 TO LAST POINT IN TRANSFORM
           │  ┌─IF AMOUNT = POINT #n AMOUNT
           │  └─THEN
<══════════════LT = POINT #n LT
              ELSE
                 IF AMOUNT < POINT #n AMOUNT
              ┌─THEN
              └─NEXT POINT

└──>INTERPOLATE/EXTRAPOLATE USING LAST 2 POINTS
```

FIG.26

DETERMINE RESOURCE AVAILABILITY (Calendar)

ON/OFF & AMOUNT TABLE

| TIME-1 | TIME-2 | QTY |
|--------|--------|-----|
| 2400   | 2450   | 3   |
| 2899   | 2990   | 0   |

<-- ON at 2400, OFF at 2450, 3 avail
<-- ON at 2899, OFF at 2990,
    Amount available not relevant

PARAMETERS
1. TYPE
2. SUPPLY INTERVAL
3. SUPPLY INTERVAL POSITION (None,Start,Middle,End)
4. CONTIGUOUS USE (Y/N) Ex: heat treat=Y, assembly=N

DETERMINE SUPPLY INTERVAL START
1. FIND TIME-1 <= GIVEN TIME
2. ┌─IF SUPPLY INTERVAL SPECIFIED (>0)
   ├─THEN COMPUTE INTERVAL START
   └─ELSE INTERVAL START = TIME-1 ENTRY

GIVEN PROPOSED SUPPLY EVENT (Time & Amount) DETERMINE ACTUAL
1. FIND TIME-1 <= GIVEN TIME
2. IF CALENDAR PARAMETER CONTIGUOUS=Y
   THEN SEARCH BACKWARDS UNTIL ADEQUATE "ON" TIME FOUND
   ELSE
     IF AVAILABLE QTY (Amount) SPECIFIED
     THEN SEARCH BACKWARDS UNTIL ADEQUATE QTY FOUND
     ELSE
       IF SUPPLY INTERVAL SPECIFIED & SUPPLY POSITION SPECIFIED
       THEN USE TIME-1 & INTERVAL TO COMPUTE TIME
       ELSE USE PROPOSED TIME

FIG.27

LOAD NEW MESSAGES (COMMAND PRIMITIVES)
┌─IF PRIMITIVE IS RESOURCE SPECIFIC
├─THEN
│   1. ┌─IF EXTERNAL RESOURCE KEY SPECIFIED
│      └─THEN LOOK-UP TABLE 701
│   2. DETERMINE INTERNAL TRANSACTION TYPE & FORMAT
│   3. ADD TRANSACTION TO 707, CREATING POINTERS 719
│   4. ┌─IF COUNT 715 IS ZERO
│      └─THEN ADD RESOURCE TO LEVEL LIST
│   5. INCREMENT COUNT 715
└─ELSE
    IF PRIMITIVE IS MULTIPLE RESOURCE RULE
    THEN IDENTIFY AFFECTED RESOURCE & ADD TO LEVEL LISTS
    ELSE PRIMITIVE IS A SYSTEM CONTROL PRIMITIVE
      ┌─IF PRIMITIVE UPDATE SYSTEM TABLE
      ├─THEN PERFORM UPDATE
      └─ELSE PRIMITIVE IS A STREAM CONTROL PRIMITIVE
        IF STOP THEN SET SHUTDOWN SWITCH
        IF PAUSE THEN PAUSE n SECONDS
        IF TIME THEN WAIT UNTIL SYSTEM=>TIME TO PROCEED

METHOD AND SYSTEM FOR CONTINUOUS INTEGRATED RESOURCE MANAGEMENT

FIELD OF THE INVENTION

The present invention relates to systems for prospective scheduling, monitoring, and control of a plurality of independent and interdependent resources. Resources include, but are not limited to, those required for the manufacture of goods or delivery of services. Applications include factory management, distribution, transportation, health care, construction, and military operations. The present invention provides a solution for the continuous (non-discrete) control of large numbers of resources with complex dependent relationships. The present invention, being continuous in operation, provides new methods for continuous evaluation of time passage impacts so that control responds to all changing conditions. New methods also provide access to coherent information about prospective events concurrent with schedule adjustments.

BACKGROUND OF THE INVENTION

Decisions can solve problems or create opportunities, and businesses depend on the right decisions at the right time. Invariant operations may use intuitive or rule-of-thumb methods for decision making. Changing conditions make decisions non-trivial because consequences of simple actions are compounded by the complex relationships of amounts and timing between resources. Methods like the Critical Path Method (CPM) use graphical representations to show sequence, dependency, and constraints. The Project Evaluation and Review Technique (PERT) uses task dependencies and status relative to forecasted completion to revise schedules and coordinate tasks.

Prospective scheduling methods solve a wide variety of business resource management problems. Resources may include raw materials, machine time, labor, space, power, or any other entity whose constraint affects the delivery of goods or services. In construction, the scheduled use of resources includes people with general or specialized skills, various single task or multi-purpose equipment, and materials requirements; in transportation, the efficient use of special or general purpose vehicles to transport people, materials, and equipment between a multitude of locations; in health care, the scheduled use of beds, operating rooms, general or specialized staff, and fixed or mobile equipment.

A response to changing requirements or constraining conditions should consider the inter-dependency of resources to correctly determine present and future resource impacts. The automation of prospective scheduling is unique in its ability to transform a simple list of requirements, dependencies, and constraints into a "mountain of data" describing future resource utilization amounts and timing. Data volumes increase dramatically with product and processes complexity. The creation of detailed schedules is a non-trivial task, but finding useful information has become the most difficult problem. Data may be simplified by approximating scheduled events to the nearest day or week (called "bucketing") and by using simple models to represent resource characteristics and dependency. Schedules can be simplified but realism is lost.

Prospective scheduling identifies where and when resource magnitude or timing constraints will be violated so these conflicts may be resolved before they actually happen. Relationships and constraints associated with products and processes must be accurately modeled to predict future events accurately. Models can include process yield and probability factors, but can not predict random events such as equipment failure, missing parts, or bad weather. Random events must be considered so that material and capacity "buffers" can be used to prevent bottlenecks. The use of "substitute" resources can also prevent bottlenecks. In either case, timely recognition and response (scheduling around) is essential to maintained productivity, and timely precise resource schedules are often a critical success factor. Material Requirements Planning (MRP) determined future material requirements and potential shortages to reduce inventory and minimize material disruptions. Accurate inventory, Bill Of Materials (BOM), and status information was required. MRP functioned well with invariant requirements (build to forecast), infrequent design changes, and a fixed production process segregated by product.

Increased manufacturing flexibility created a need for long term strategies based on production capacity and anticipated product mix. Similar scheduling methods were applied to control business operations including production capacity, distribution, equipment maintenance, and shop floor scheduling. Frequent adjustments to schedules were required because small changes in requirements, status, products, processes, or their constraints result in changes to many resources.

Manufacturing Resource Planning (MRP-II) divided enterprise resource management into smaller manageable pieces managing material and capacity requirements independently and interactively, developing schedules for dependent resources based on simple lead-time constraints or limited finite models. The common practice of converting external real dates to internal contiguous shop dates using a shop calendar simplified lead-time offset calculation but restricted the use of multiple calendars in finite planning and prevented net-changes to calendars. Dependent resource amounts and timing were approximated. Timing of variable size lots could not be accurately determined from conventional routings.

Prior art has not provided an integrated solution for different levels of resource management. The MRP-II model divides plans into "levels" in order to separate strategic, tactical, and operation plans because no one set of rules would allow practical co-existence. Operational resource utilization rules would consider details not relevant at the strategic level, producing detailed schedules by shift for the next two or more years. Large data volumes would make these schedules unmanageable both by the system and user. Conversely, operational plans produced by strategic planning rules would summarize plans in monthly or quarterly periods, with no visibility of detailed daily requirements.

MRP-II was designed to create stable production schedules to drive manufacturing operations. MRP-II was NOT intended for decision support or to respond to changing conditions. A limitation of this modular method is lack of visibility between strategic, tactical, and operational levels of resource management. Each level redefines resource schedules over different planning horizons and resolution, so that relationships between levels is often confusing. In practice each planning module may be provided by a different vendor, and no standard for inter-operability exists. This makes it difficult to determine future or global impacts of short term random events, such as equipment failure, and to respond quickly and optimally. When problems exist, but alternatives can not be identified or compared, predicted resource conflicts are not resolved and productivity is lost.

The Optimized Production Technology (OPT) recognized that flexible manufacturing could not be controlled by local strategies, in direct conflict with MRP-II approach of dividing resource management into specialized modules. OPT understood the role of single constraints (bottlenecks) in determining production throughput and efficiency. MRP-II implementations often ignored the effects of interacting resources so that global optimums are not achieved. The MRP-II strategy of "follow the schedule" pushed orders through production while failing to anticipate future scheduling bottlenecks. Orders could be "pushed" through production at a rate greater than the overall process can accommodate.

OPT methods can provide high production efficiency, but time consuming calculations have limited its use to production process design and monthly or quarterly adjustments. Many OPT principles were adopted in Just-In-Time (JIT) manufacturing. JIT does not anticipate resource requirements and does not require calculation. Instead, JIT schedules according to bottlenecks by pulling orders through production, avoiding queue backup preceding bottleneck resources. JIT relies on MRP-II to develop prospective material and strategic resource schedules.

Advances in the speed and flexibility of manufacturing equipment and methods have provided responsiveness that prior art prospective methods can not control. Robotics, Computer Integrated Manufacturing (CIM), flexible work cells, and methods like JIT have compressed production times from weeks to hours. The ability to produce a variety of products through the same production facilities creates bottlenecks that constantly move. Manufacturing methods have created business opportunities and competitive advantages by reducing customer delivery time and costs. These methods depend on prudent decisions to optimize productivity and delivery in a constantly changing environment.

Prior art methods for net-change updating is a discrete (batch) process that revises schedules overnight, providing schedules and exceptions each morning that reflects the real conditions (reality) at the end of the previous day. Soon after the new day begins, a decision to correct just one of hundreds of exceptions partially invalidates any remaining exceptions. A single change in production policy could affect hundreds or thousands of schedules. Each day when machine availability, customer requirements, priorities, etc. change, schedules and exceptions no longer reflect reality. Schedules are often days or weeks behind real world events they represent.

Scheduling exceptions determined by nightly processing identify future problems based on current (steady state) conditions. Real world conditions are NOT steady state, and even when schedules remain unchanged their condition can change with the passage of time. These situations result in unrealistic information and poor decisions.

Discrete methods fail to recognize changes in conditions, constraints, and dependent relationships as they occur. When schedule maintenance is collected and processed as a batch, any single change ignores its interaction with other changes. Resource dependencies create hidden relationships between exceptions and their corrective actions. Ignoring these interactions can produce more exceptions than before, a common behavior of the prior art. Discrete methods delay schedule updates and the probability of correct schedule changes. Timeliness is further compromised when change activity is unusually high. Daily schedule "adjustments" are only practical to a small proportion of schedules, and require "locking" data during processing to assure update integrity. The processing of net-changes is far less efficient than the initial creation of all the schedules. Powerful parallel computing platforms can accelerate processing, but operation is still discrete and methods are poorly suited for the tasks required.

SUMMARY OF INVENTION

The present invention comprises methods for continuous prospective scheduling and control of multiple interdependent resources to accomplish predetermined goals in a timely and efficient manner. The method comprises automatically processing information according to predetermined rules and constraints to provide signals to schedule and control actions providing a processing unit and memory for permanent and temporary data files, providing a resource engine for each predetermined resource, providing an action control for each management function, providing a router, providing information about each resource comprising resource characteristics, rules for resource use, and relationships with other resources for permanent data files, initializing with independent demand and current conditions, continuously monitoring changes in independent demand and conditions using data from external agents, and determining actions to be taken based on resource information and changes, the router managing, logging and certifying delivery of instructions from and between resource engines, action controls, and external agents.

A preferred embodiment provides a system for the practical application of the methods of the present invention to large, complex, and constantly changing prospective schedules. The system includes a processing unit, permanent and temporary data files, one or more resource engines, one or more action controls, and a router. The present invention represents advances in the fields of computer science, operations research, and industrial engineering.

For a preferred embodiment, methods of the present invention improve performance, support continuous operation, and improve resource management through effective decision support. The present invention contemplates that decisions are distributed throughout an enterprise and that resource conflicts must be identified, prioritized by importance, alternatives analyzed, and corrective actions implemented. To provide a distributed scheduling and control capability, a preferred embodiment is comprised of one or more resource management and action control components operating on digital computing and communication apparatus. Preferably a router manages, logs and certifies delivery of instructions from and between resource engines, action controls, and external agents. These components interface directly or indirectly with the resources being controlled and are capable of continuous fault tolerant operation.

To improve decision timeliness and quality, the present invention preferably develops realistic schedules, identifies conflicts, and continuously adjusts schedules in response to changing requirements, conditions, and constraints. Cooperative processing methods are preferably used to concurrently process changes, update schedules, and consider time passage effects. Continuous operation is achieved by consolidating change activity by resource, and controlling the sequence of updates by relative resource level. Consolidation maintains a linear relationship between throughput and workload. Coupled with a preferred internal database, preferred embodiments of the invention can provide inquiry concurrent with updates. Preferably the complex logic and arithmetic defining constraints and relationships are pre-compiled further reducing run-time.

Preferably, pre-compiled formulas create parameters used by the scheduling process to precisely model dependent resource amount and timing relationships of unlimited complexity. Calendars can accurately describe resource availability in terms of amount and timing, and preferably are continuously adjusted to reflect real world situations when equipment fails, employees become ill, etc., providing realistic schedules.

To provide a global view of decision alternatives, consistent information from strategic, tactical, and operational viewpoints are required. The present invention provides event information and accommodates diverse resource types, relationships, constraints, and multiple sets of rules for future intervals of time. Heterogeneous resources are preferably scheduled simultaneously in a common process to integrate the management of capacity and materials schedules at multiple levels of detail. A single integrated schedule can contain long term forecasts, actual customer orders, and production schedules, with a level of detail and time resolution appropriate to each. This eliminates the need for redundant information, eliminates inconsistency, and provides demand (up) and supply (down) visibility from strategic through operational management levels.

For a preferred embodiment the invention provides response to the effects of time passage, a type of feedback necessary to control the initiation of scheduled activities, including but not limited to factory machine control, the release of orders, detection of overdue order completions, and time deferred actions. Time passage processing manages an active queue, concurrent with other processing, to recognize the effects of time passage on the condition of schedules and initiates required processing. Schedule balancing determines the timing and amounts of supply events necessary to satisfy demands and time of next condition change. Condition changes may require decisions or direct actions to apparatus under direct or indirect control.

The present invention provides operational modes for automatic response and interaction with an operator. Heuristic methods preferably identify problems, establish priorities, identify all the alternative and best solutions, and implement actions with minimal data entry.

A preferred embodiment supports Just-In-Time (JIT) manufacturing by providing a notification of exceptions describing present and prospective resource scheduling problems in real-time. Timely and accurate information is used to pinpoint resource bottlenecks and determine the most appropriate action.

BRIEF DESCRIPTION OF DRAWINGS

FIG. 15 is a series of tables and charts illustrating timing for operations arranged in series, parallel, and combinations having fixed and variable timing components.

FIG. 16 is a table, chart, text, and formulas illustrating the timing transform evaluation of transfer batches in serial operations.

FIG. 17 is a block diagram illustrating timing transform definition and use.

FIG. 20 is pseudo code illustrating operation of the START-UP component part of resource engine 601.

FIG. 21 is pseudo code illustrating operation of the PROCESSING CYCLES component part of the resource engine 601.

FIG. 22 is pseudo code illustrating operation of the PROCESS ONE RESOURCE component part of the resource engine 601.

FIG. 23 is pseudo code illustrating operation of the BALANCE SUPPLY & DEMAND component part of the resource engine 601.

FIG. 24 is pseudo code illustrating operation of the DETERMINE DEPENDENT AMOUNT component part of the resource engine 601.

FIG. 25 is pseudo code illustrating operation of the DETERMINE DEPENDENT TIMING component part of the resource engine 601.

FIG. 26 is pseudo code illustrating operation of the DETERMINE RESOURCE AVAILABILITY component part of resource engine 601.

FIG. 27 is pseudo code illustrating operation of the LOAD NEW MESSAGES component part of the resource engine 601.

DESCRIPTION OF THE INVENTION

Figure 1:
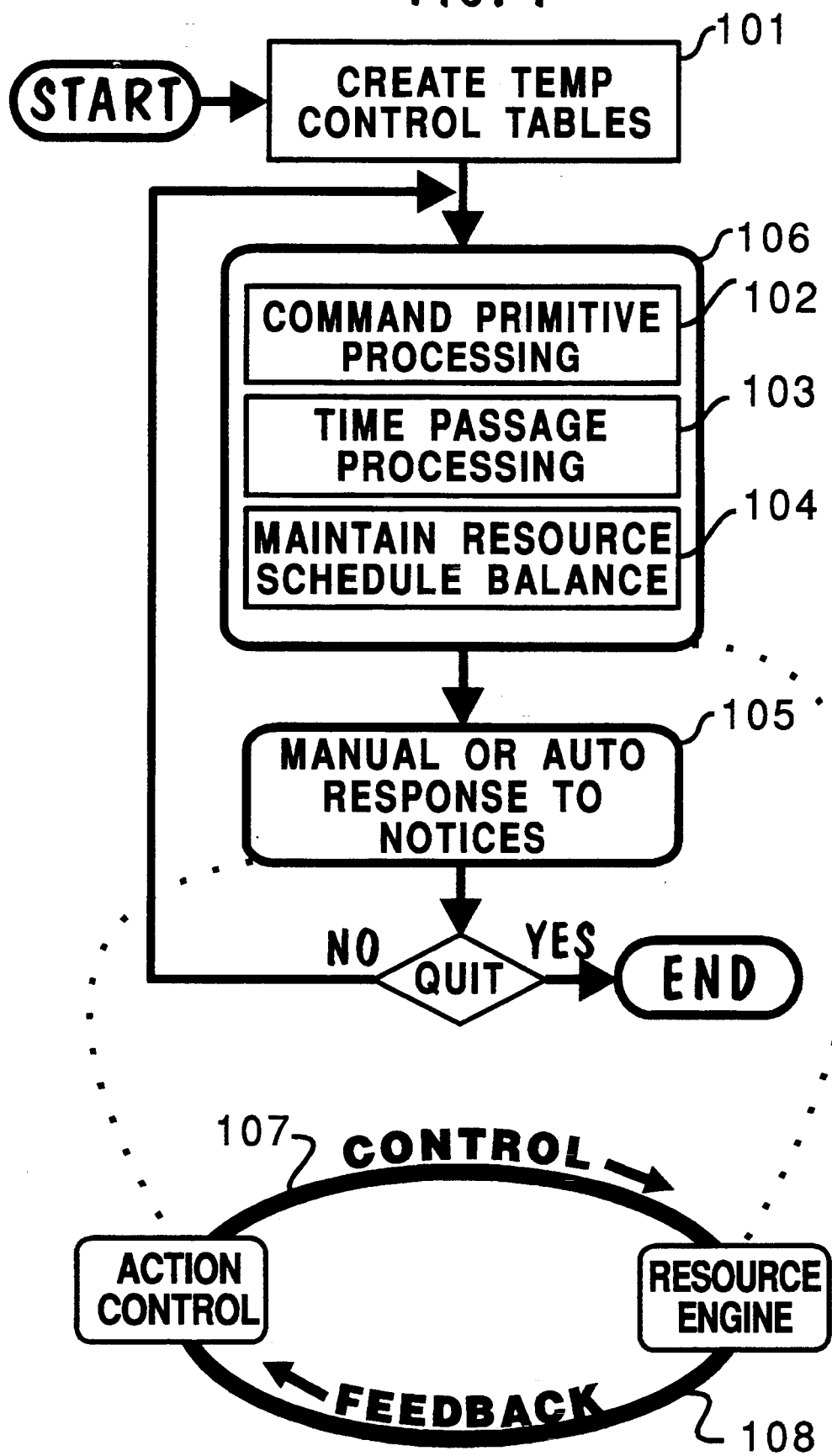
FIG. 1 is a summary flow chart illustrating the method of continuous resource management.

The present invention requires the proper operation of a number of algorithms especially constructed to implement the methods described herein to achieve continuous real-time operation, maintain information integrity, and assure recoverability on ordinary computer platforms. These methods develop schedules, identify conflicts, and continuously adjust schedules in response to changing conditions. Methods manage a multitude of diverse resources from a strategic, tactical, and operational viewpoint simultaneously. These methods for integrated resource management are essential in obtaining an accurate global perspective. Diagrams supplement the narratives describing the operation and control logic of a preferred embodiment of the methods of the present invention.

A preferred embodiment of the present invention is a system consisting of one or more continuous prospective scheduling parts, referred to hereafter as resource engines, and one or more action control parts, referred to hereafter as action controls that exchange control information by means of a protocol referred to hereafter as command primitives. A preferred embodiment of the present invention provides system that makes continuous resource management practical. Operation is continuous rather than discrete (batch) and therefore substantially different from the prior art. Methods used are responsive to constantly changing requirements, constraints, and the effects of passing time.

Construction of a working model from this patent description requires expertise in Computer, Industrial, and Management Sciences, information system architecture, computing hardware, operating systems, artificial intelligence, data management, object design, Industrial Engineering, production & inventory control, Computer Integrated Manufacturing (CIM), and Operations Research. Alternate methods of construction are possible, and the basic method shall be refined by those skilled in the art.

The present invention may be implemented in any combination of software, firmware, or hardware, and may be connected directly or indirectly through other control systems to devices under its control. The present invention contemplates automatic or manual operation by notification of an operator through visual or auditory means.

The present invention contemplates that other control and information management systems will provide information required for continuous operation. This includes facts about initial and changing requirements, status of work in process, product structure and constraints, and process operations and constraints. A preferred embodiment is a system comprised of multiple resource engines and action controls that communicate with each other and essential elements of other systems through messages. The routing component of a preferred embodiment maintains system information replicated in each resource engine that identifies all message sources and destinations, supporting both centralized and distributed construction.

A preferred embodiment has demonstrated the behaviors of its methods and quantified, through simulation, an ability to manage resources in real-time. One benchmark compared processing speed relative to conventional methods, using randomly distributed product and process relationships from 2 to 10 levels deep and branching factors from 2 to 25. A schedule of 100 events and 10 dependents was the basis of performance measurement. A large enterprise may have 30,000 scheduled resources and would typically require 6 hours of main-frame class computer time to initially generate schedules. The present invention produced the same results in less than one hour on a personal computer at a rate of approximately 10 complete schedules per second.

Methods used for performance measurement and simulation were essential in the development of a behavior that is capable of continuous fault tolerant resource management but are beyond the scope of the present invention and not described herein.

FIG. 1 illustrates a continuous process comprised of scheduling, exception notification, and corrective action. The process starts when step 101 creates all temporary tables required for processing. Messages in the protocol of command primitives are received from other systems, action controls, or other resource engines and processed 102. Command primitives describe global and resource specific resource requirements, rules and dependent resource requirements. Primitives that apply to more than one resource are processed immediately to update control tables or trigger processing of one or more affected resources. Concurrent with processing in 102, as time passes 103 determines if passing time has changed the condition of a resource schedule, and adds any such resources to the processing queue.

The maintain resource schedule balance component part 104 operates concurrently with component parts 102 and 103. Processing adjusts scheduled events in response to changes in requirements, rules, dependency, or status. A preferred embodiment implements a form of cooperative processing instead of asynchronous multi-processing. Changes produced by 102 are separately queued for each resource in the order received. Resource processing sequence is determined by relative level values maintained within the system.

Balancing in 104 applies rules that determine the amounts and times of all scheduled events and required changes to demands upon dependent resources as determined by:

The resource response and persistence to supply and demand events.

The formulas describing amounts for each dependent resource.

The time required (lead) computed from data points describing the transform "time as a function of quantity" as defined explicitly, specified as a network of series and parallel operations, or a curve fit from historical data.

The available time intervals for the resource.

If "balancing" changes the:

Present schedule condition, creates a change notice, dispatching this message to the responsible operator or user.

Time of the next anticipated schedule condition change, determines the new time, and maintains the time passage processing tables.

Scheduled supply event amounts or times, then existing scheduled events are adjusted, deleted, or new events created as required.

Scheduled events or the relationship with any dependent resource, then the impact of any such changes upon dependent resource demands are noted and queued for subsequent processing.

The concurrent operation of 102, 103, and 104 comprise the principal methods of the resource engine 106. When any resource(s), given the stated rules, can not satisfy requirements, the resource engine produces notices of such conditions.

These notices are acted upon automatically or through intervention of a decision process by one or more operators/users in the response 105. As described more fully herein, a decision process has three essential parts: discovery, choice, and action. Each operator is provided with a action list prioritized by rules defining the relative merit of each resource and type of condition. Alternative actions (choices) are provided, from which corrective command primitives are generated without data entry. These command primitives are then directed to one or more resource engines for processing as described in 102, 103, and 104. These and other functions support a timely and interactive decision process 107 & 108. The entire process above is repeated continuously.

Figure 2:
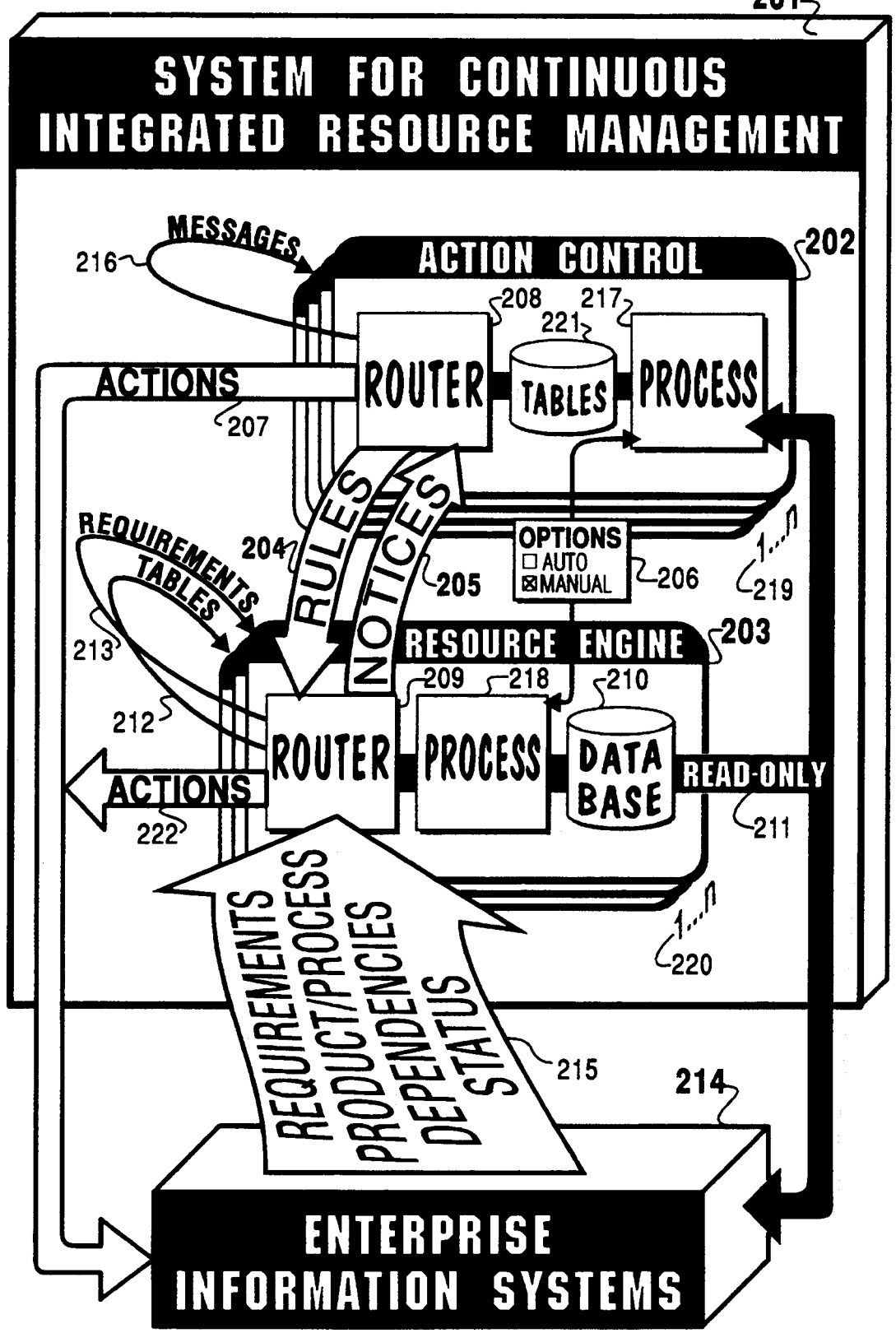
FIG. 2 is a block diagram illustrating the arrangement of multiple resource engine and action control components in a system for continuous integrated resource management.

FIG. 2 illustrates the major component parts of a preferred embodiment of a system for continuous integrated resource management 201. This system interacts with external enterprise information systems 214 through command primitive messages described more fully herein. Sources of information in 214 that describe activities relevant to resource management, send command primitive messages 215 to one or more resource engines 203. The router component part 209 assures message integrity, and forwards or returns messages to other routers 208 and external systems 214. Messages describe resource requirements, products and process characteristics, dependencies, and status.

The action control 202 sends command primitives defining rules 204 to the resource engine 203. The resource engine determines prospective resource utilization and identifies resource conflicts that are sent as notices 205 to the action control 202. The action control process 217 maintains rules that order notices by priority within tables 221. The action control sends requests for actions 207 to appropriate systems 214 to alter operations.

As time passes, external information systems that control and monitor work in process operations, customer order entry, purchasing, receiving, etc., notify the resource engine of changing conditions, and the entire process described above is repeated.

The command primitive router component parts 208 and 209 of a preferred embodiments of the resource engine and action control, manages command primitive interchange 204 & 205 between multiple resource engines 203 and action controls 202. The routers authorize, logs, routes, and certifies delivery of command primitives based upon system tables describing:

1. The action control, resource engine, and enterprise information system agents of the system.
2. Communication paths and controls.
3. History of all command primitive interchange.

A resource engine can update its own database tables 210, while others can only read them 211. An engine creates command primitives 212 to replicate system table content changes to all other engines. An engine may also create command primitives describing dependent requirements 213 for other engines and actions 222 to external agents.

The action control can operate in a variety of instant, delayed, manual and automatic modes 206 as determined by options defined during process initialization. In automatic mode the action control responds immediately using a heuristic method to determine the best action. In manual mode an operator is alerted, provided with alternative actions, and chooses an action.

Figure 10:
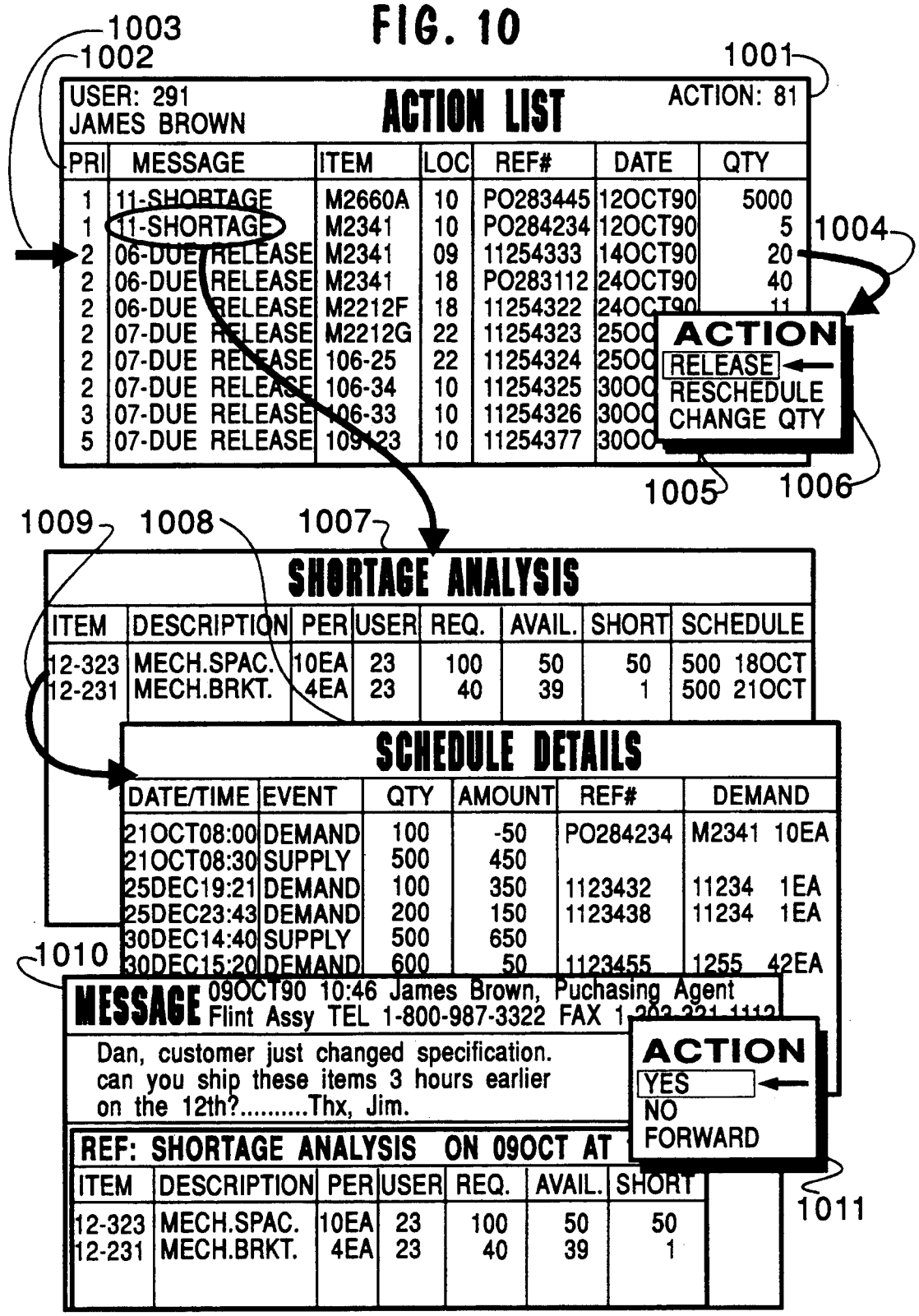
FIG. 10 is a series of displays illustrating the operator interface of the action control main component.

Action controls send primitives requesting action to external agents 207, rule changes to engines 204, and messages to other controllers 216. An important action control task is to coordinate actions outside its resource control domain 216 & 207. In FIG. 10, when the choice of action is not clear, the action control provides focused information analysis 1009 to identify the root cause of a problem. This may identify resources managed by other controllers whose location is known by the router 208. Operator entered messages are attached to context and focused analysis information and automatically directed to the correct destination. The received message 1010 provides an frame of reference and avoids a redundant remote analysis.

Recording Heterogeneous Resources

Resource bills have failed best efforts to adequately describe the full spectrum of resource types necessary for true integrated resource management. A multitude of scheduling problems often require custom solutions because the specific characteristics of resources being managed are atypical. A preferred embodiment uses common terminology, data, and process to schedule a multitude of resource types including, but not limited to, materials, machine and labor capacity, and time itself.

In a preferred embodiment has carefully considered between the interaction between schedule data organization and the methods used to manipulate those schedules. These methods are described fully within the resource engine main part described herein, specifically the method for balancing of supply and demand.

Figure 8:
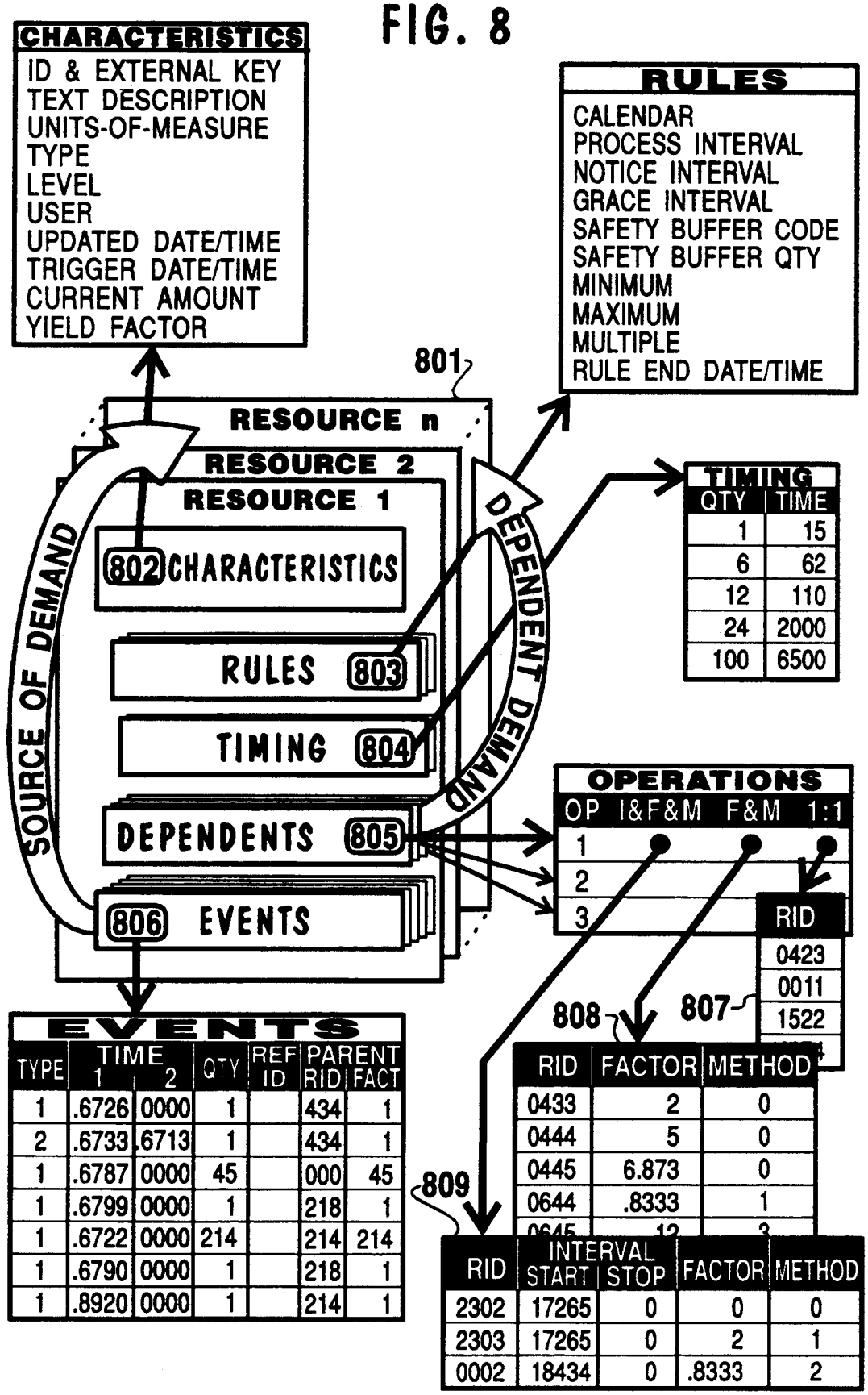
FIG. 8 is a series of tables illustrating the arrangement of permanent data tables used by the resource engine.
Figure 13:
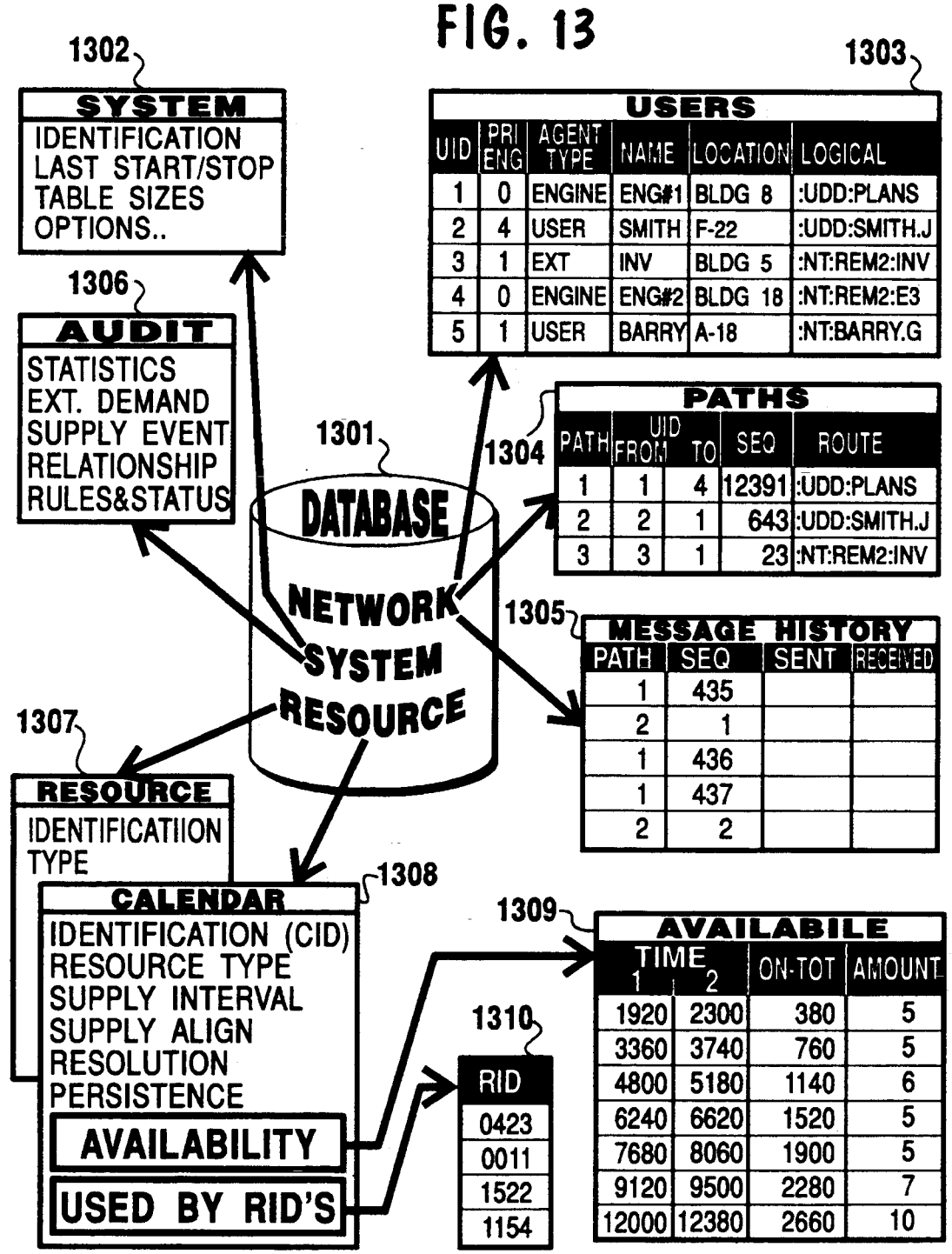
FIG. 13 is a series of tables illustrating the resource database construction including system initialization, control, and message routing logical constructs.

The creation of scheduled events applies to time itself. A detailed shop calendar is an expression of when things happen and when they do not. A method of the preferred embodiment uses calendar information as rules to determine valid start and stop dates for activities. Using this method, calendars can represent actual schedules in different plants or work centers, and changes in availability do not require total schedule recreation. This is accomplished by treating a calendar as a schedule. In FIG. 13 the available table 1309 if compared to the event table 806 in FIG. 8 is almost identical. The RID list 1310 is identical to dependent resource information 807.

Figure 3:
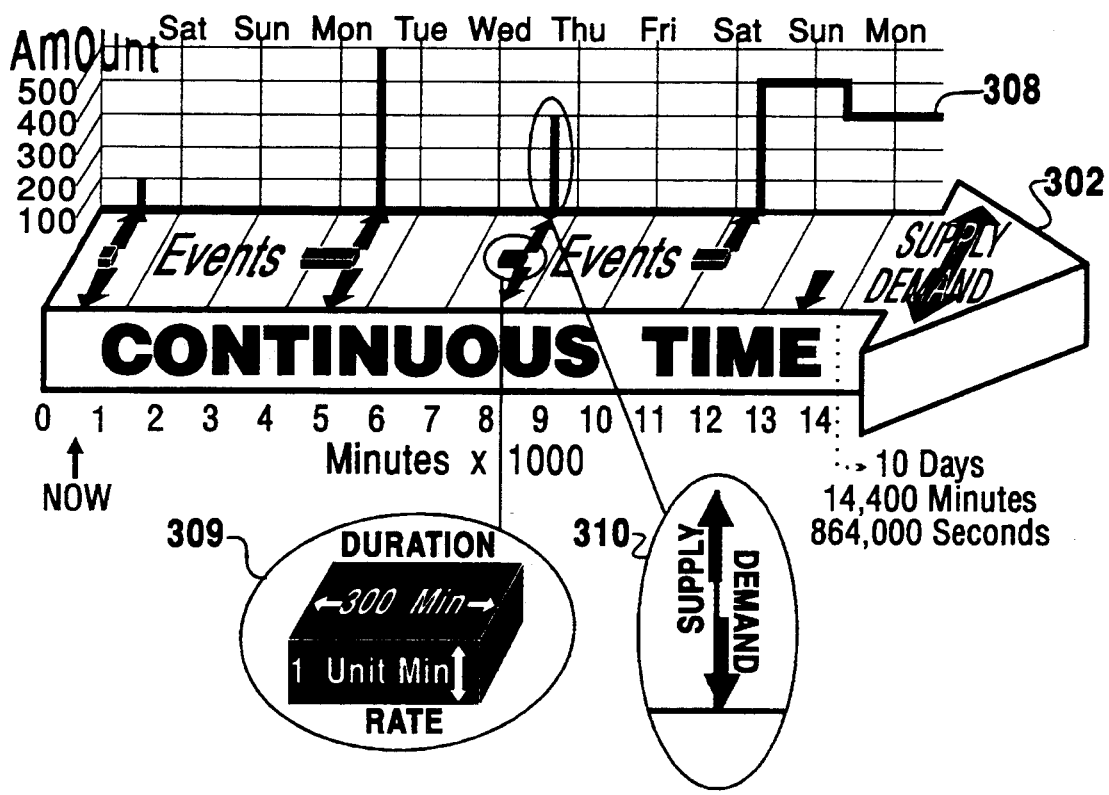
FIG. 3 is a table and graph illustrating the representation of supply and demand events for a material type resource.

FIG. 3 illustrates a schedule for events without rates (typically materials) numerically and graphically. In a preferred embodiment all resources are represented by a single data definition and evaluated by a single process. FIG. 3 provides an example of material resource representation in table 301, and continuous time graph 302. A single table 301 contains data describing all events on the time horizon. An event is some action that changes the resource amount at a specific point in time called TIME-1 303. Events are always ordered in ascending TIME-1 303 sequence. If the event is not instantaneous then TIME-2 304 specifies when the event actually started. The difference between the two times is the duration of the event and is calculated as required. The event type 305 determines if the amount 306 of the event will have a positive (supply) or negative (demand) impact on the balance 307 of resource remaining. For supply events type 305 determines if the method for balancing supply and demand is allowed to change timing and amount. For demand events type 305 describes if the demand is anticipated or real, dependent or independent.

Events shown graphically on the time line are described as an up (supply) or down (demand) arrow, and as a box 309 whose dimensions correspond to duration and rate. The line graph 308 is the amount of resource as a function of time referred to as the balance 307. Ideally, all supply events align perfectly with demands in both time and amount. Under these circumstances the line 308 would be a straight line at zero. As shown in 310 there is usually some time difference, either positive or negative, that results in a temporary positive or negative balance. A positive balance is commonly referred to as excess and negative as shortage.

The example of FIG. 3 is a material type resource. Parameters describing the behavior of a resource type specify if amounts are treated as absolute values (material) or rates (capacity), and whether the balance is retained or reset at defined intervals. Values of time 303 & 304 and the amount 306 are the raw data, and event type in conjunction with resource type determines the behavior of the resulting balance 307. In this material example transitions in graph line 308 are vertical because the amount 306 is treated as an absolute value of change and the balance does not decay to zero because it is persistent.

Figure 4:
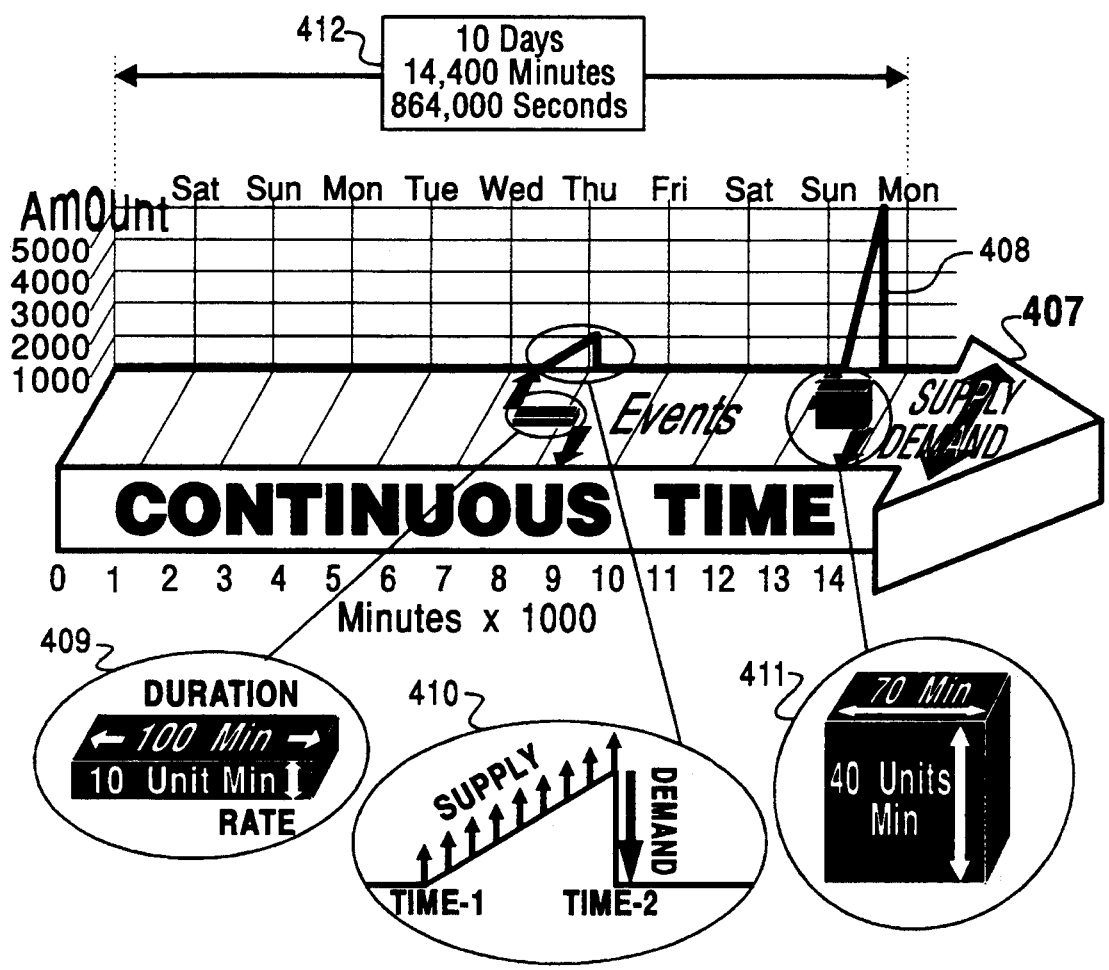
FIG. 4 is a table and graph illustrating the representation of supply and demand events for a capacity "rate" resource.

FIG. 4 illustrates a schedule of events with rates (typically machines & workers) in TABLE 401, graph 407, and line 408. The TIME-1 402 is still the point in future time when the resource's amount first changes. The TIME-2 403 is greater than TIME-1 and determines when the event ends. Events with a duration (TIME-2 minus TIME-1) have an AMOUNT 405 that is a "rate". The AMOUNT 405 multiplied by the duration is the amount by which the resource is consumed or supplied. FIG. 4 is similar to FIG. 3 but is a capacity-type resource. The first event is supply event of beginning at TIME-1 402, ending at TIME-2 404, of amount 405. The difference between the two times is still the duration 409. TIME-1 is still the time when resource balance is impacted. TIME-2 is GREATER than TIME-1 indicating that the rate 409 is now represented by the amount 405. Event 1 has a rate of 10 as shown in 409, while event 3 has a higher rate of 40 as shown in 411.

Back in FIG. 3, TIME-2 was less than TIME-1, representing when the event was started, so regardless of the duration the amount is applied directly to the balance. Now in FIG. 4, the duration of 100 must be multiplied by amount to determine the total impact on the balance. The balance at any point in time 410 between TIME-1 402 and TIME-2 403 can be calculated using amount 405 as a rate.

A comparison of TIME-1 and TIME-2 identifies when an event expresses a rate or an absolute amount. The event and resource types allow for all possible combinations of positive and negative impacts and persistence in determining the balance. An minimum number of variables and parameters are used in conjunction with simple logic to produce schedules that accurately represent realistic schedules for a multitude of resources.

Integrated Resource Management

The goal of Integrated Resource Management (IRM) is to make localized short term decisions based upon global longer term impacts, and visa versa. A preferred embodiment contemplates multiple rule sets, detail calendars that define availability times and amounts, and precise dependent timing and amounts. This provides detailed short term through summary long term schedules concurrently.

Figure 5:
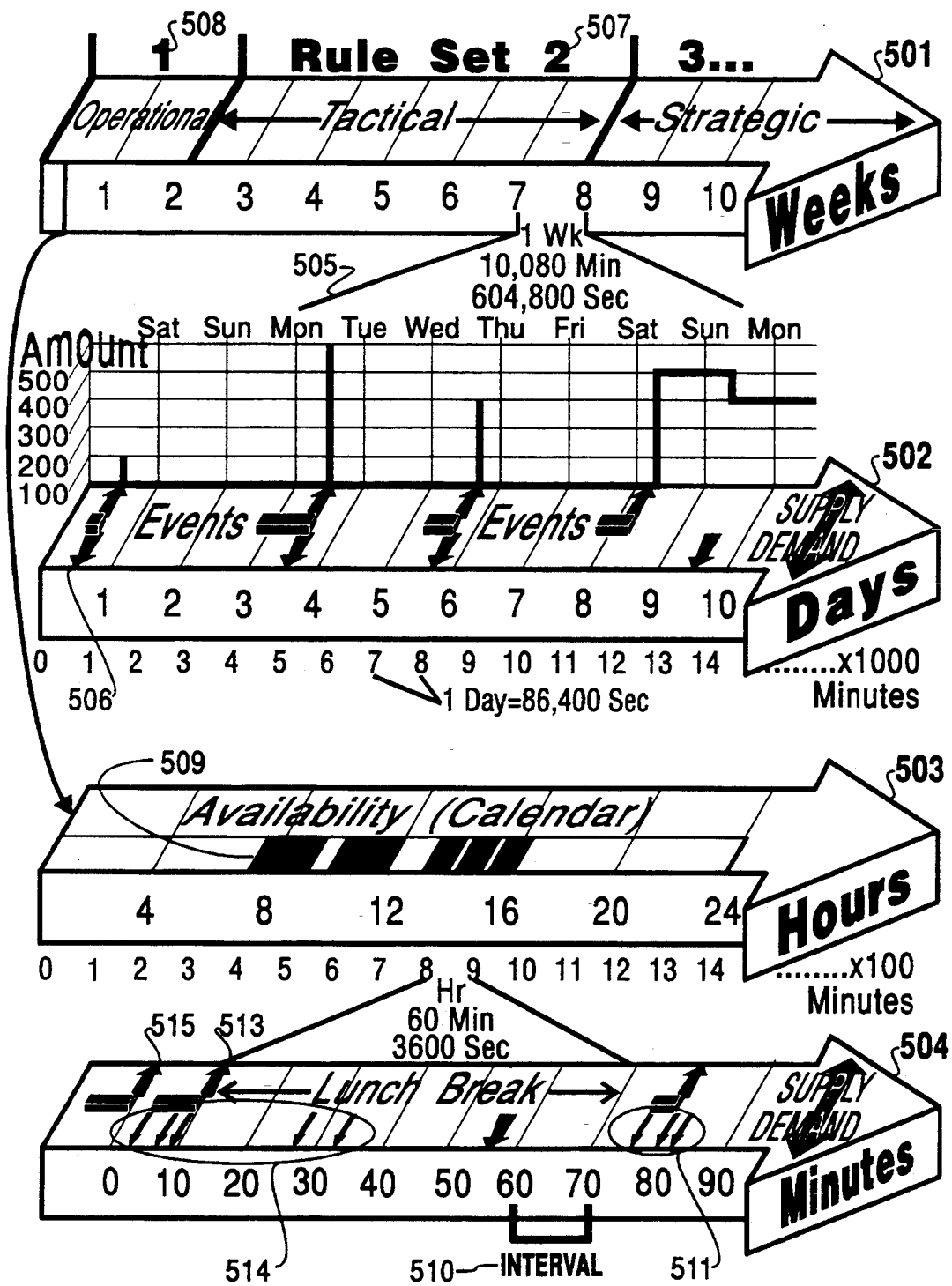
FIG. 5 is a series of graphs illustrating the definition of multiple rule sets for a single schedule, calendar "availability information" to determine the supply event timing and amount, and intervals for demand consolidation.

A preferred embodiment treats time as integer values representing seconds. Examples show events on a continuous time line in minutes starting at zero, but any units may be assigned 402. FIG. 5 illustrates the application of multiple rule "sets" and availability calendars as rules to achieve realistic and integrated schedules. Time line 501 is shown on a scale of 0 to 10 weeks. In a preferred embodiment the underlying data is still "unbucketed" consisting of individual events whose position in time measured in seconds. One week on this chart is still 10,080 minutes or 604,800 seconds. The event table is simply "indexed" by a list of pointers identifying the first events in week 1, 2, etc.

Time line 502 expands week 7 in 505 to show 10 days, but one week on this chart is still 604,800 seconds. The event table is simply "indexed" by a list of pointers identifying the first events in each day 1, 2, etc. A typical event 506 is one of many on time line 502 that appear at a frequency of about every 2 or three days. Supply event frequency is controlled by one or more sets of rules 507 defined for this resource. Week 7 is in the "tactical" realm so demand events (requirements) are grouped as determined by rules for the purpose of creating a sensible number of supply events (factory orders).

Time line 503 takes a day and shows 24 hours. If the rules regulating the creation of supply orders were now operational rules 508, then more frequent grouping of supply orders would be specified, perhaps 1 per hour. At this level of detail, we use a calendar that specifies the near term availability of resources, including things like lunch, special training, etc. The available time 509 appears flat because an "amount" available as a function of time has not been defined. A preferred embodiment of the resource engine implements calendars as simplified resource event tables.

Time lime 504 obeys both the rules of operational planning and the availability of the calendar specified by those rules. An interval 510 defines the grouping of demands into supply events 511. If additionally, the availability 509 constrained supply, then the demands 512 in the interval before and during lunch would be combined into a supply event 513. Any demands that exceed capacity 514 could be satisfied by the supply of the next earlier interval 515, or reported as an exception.

RESOURCE ENGINE

Figure 6:
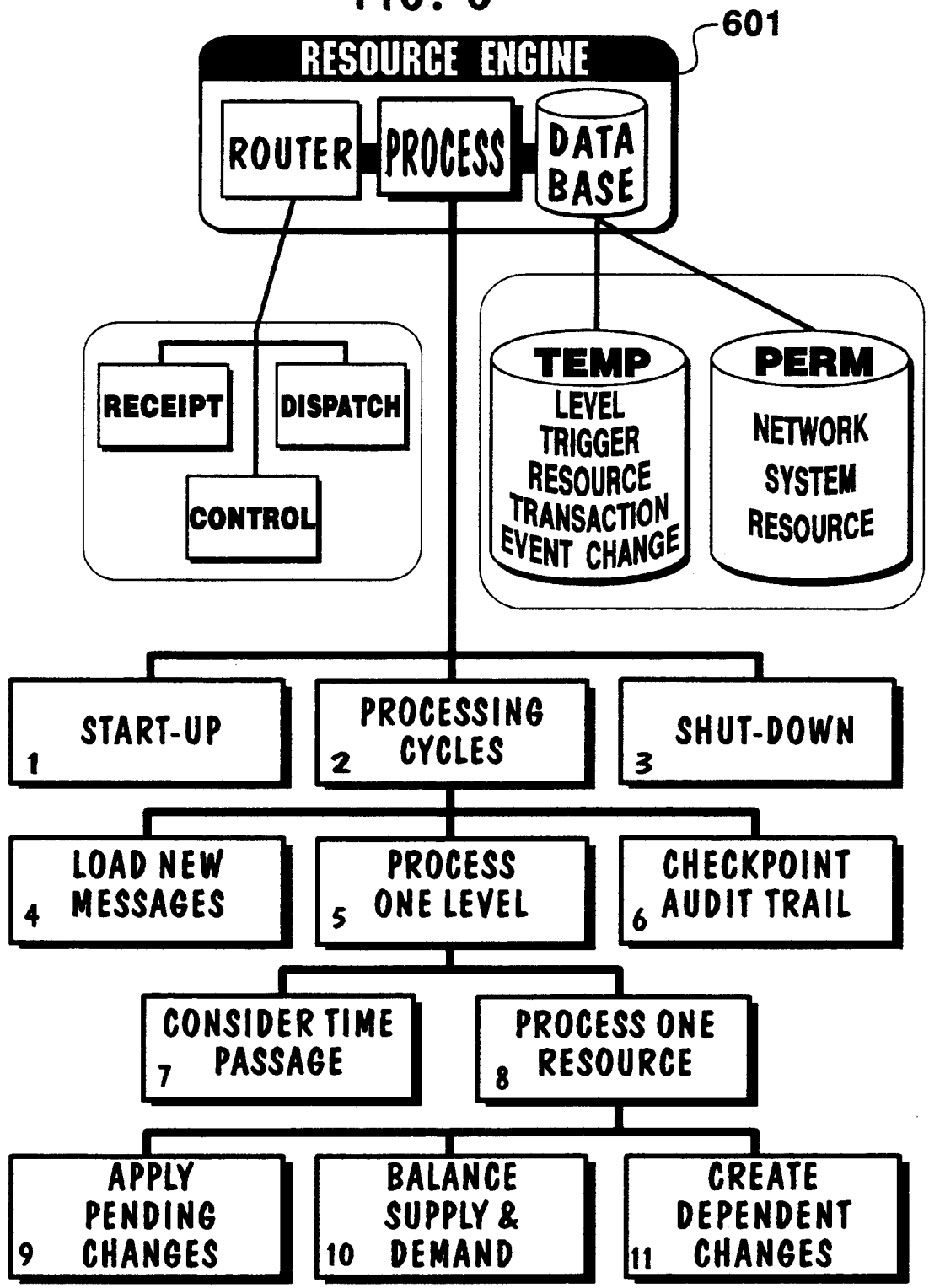
FIG. 6 is a chart illustrating the arrangement of component parts and data tables in the resource engine main component.

The resource engine preferred embodiment consists of consists of 11 component parts for which essential algorithms and data structures are described herein. The sequence and hierarchical relationships shown in FIG. 6 are different from ordinary methods. Special care was taken to develop new methods to provide the behavior required for continuous operation with concurrent inquiry and update while assuring fault tolerance or recoverability. Special care was also taken to completely integrate the data and processes of capacity and material resources, and to manage such information so that a single data set could be employed for strategic, tactical, and operational resource management. A preferred embodiment is an object oriented design whose methods manage data directly and whose inputs and outputs are in message form. Cooperative rather than multi-processing methods were used to achieve practical concurrent operation of component parts 4, 7, and 8. Data structures and algorithms were designed to achieve maximum performance on a general purpose digital computing apparatus.

Components

The 11 component parts of FIG. 6 contain hundreds of algorithms and data structures that act upon the stream of input, maintain a permanent data structure, and produce output messages.

1. The "START-UP" component part opens all input and output files and streams and allocates and builds all temporary tables defined in FIG. 7. The size of each table is determined from initial parameters. The audit and control tables are evaluated to determine if the continuous resource management process was interrupted and if validation of permanent resource data is necessary. The entire permanent resource data in FIG. 8 is read sequentially in order to build temporary tables 701 and 705. The essential logic of this component part is described in FIG. 20. A preferred embodiment operating on a personal computer required approximately 5 seconds per 1,000 resources.

2. The "PROCESSING CYCLES" method uses the level 702, resource 705, and transaction 707 tables to control operation. A cycle processes all levels in sequence, if the resource count 710 is non-zero. If no pending activity or input exists, processing is suspended temporarily. The cycle is repeated until a message requests a controlled shut-down. The essential logic of this component part is described in FIG. 21.

3. The "SHUT-DOWN" process completes the audit trail, releases all temporary tables, and terminates operation.

4. The "LOAD NEW MESSAGES" method reads command primitives, validates and translates all external identification of product and process resources (parts, models, work centers, departments, etc.), and requirement orders into internal resource engine references. Primitives are divided into three classes; rejected—returned to sender, resource specific—added to the pending transaction table, and non-resource specific—processed immediately. The essential logic of this component part is described in FIG. 27.

5. The "PROCESS ONE LEVEL" method processes all resources with pending activity that have the same level value. As resources are processed in component part 8, new change transactions are added. Resource levels are verified and if necessary adjusted in component part 11. At the completion of each level the next level with activity is processed. The essential logic of this component part is a sub-part of processing cycles logic described in FIG. 21.

6. The "CHECKPOINT AUDIT" component part creates a permanent audit record processing statistics for data integrity and performance evaluation. The audit record is used by component part 1 to determine if resource database validation is required.

7. The "CONSIDER TIME PASSAGE" is a component part specifically designed for continuous prospective scheduling. The balancing component part 10 creates a time trigger value, a future position on the prospective time horizon when the condition of that resource will change. As each level is processed, the current time is used to determine if any resources require evaluation due to a condition change, and adds them to the processing queue. A preferred embodiment contemplates that time trigger values change frequently, and efficiently manages an ordered list for time passage processing purposes.

8. The "PROCESS ONE RESOURCE" component part is by far the most complex component, and uses tables to simplify and accelerate processing. Resource processing reads the permanent resource data (describing requirements and scheduled events, rules, and dependent resource requirements), revises its contents, and updates the permanent record. The essential logic of this component part is described in FIG. 22. Subordinate components parts 9, 10, and 11 use methods that dramatically improve performance as compared to the current state of the art.

9. The "APPLY PENDING CHANGES" component part applies pending transactions that update requirements (demands of all types including customer orders), rules (lot sizing, timing, etc.), dependent resource relationships (product structure, process routing), or status (inventory adjustment, order release, completion, etc.) applied to permanent resource data. Dependent demand changes result from higher level (parent) supply event changes and are determined by combining all demand change transactions 707 with their referenced 727 lists 706 of changed, deleted, or new supply events. The event change table 706 is saved at the end of each level to facilitate recovery. When combined with the parent's dependent resource list 805, dependent changes may be re-constructed. The essential logic of this component part is described sub-part 2 of FIG. 22.

10. The "BALANCE SUPPLY & DEMAND" component part traverses the time horizon determining the supply events required, compares these with previously scheduled supply events, and defines adjustments of amount and/or time in the event change tables 706 and 708. These entries are referenced by dependent change transactions created in component part 11 and will eventually be processed by component part 9 for some other dependent resource. This component also determines when rules are violated, collecting statistics to determine relative required action priority, based on prioritization rules specified. The next future point in time when this condition changes is determined for use in component part 7. The essential logic of this component part is described in FIG. 23, FIG. 24, FIG. 25, and FIG. 26.

11. The "CREATE DEPENDENT CHANGES" component part creates dependent transactions for subsequent processing. Essential logic is described in sub-part 5 of FIG. 22. If balancing supply and demand in component part 10 results in adjustments to supply events, a dependent change transaction is created in table 707 for all dependent resources in 805. These transactions refer to a group of event changes 706 describing parent scheduled event additions, deletions and changes and are subsequently processed by resource engine component part 4.

Data Tables

Figure 7:
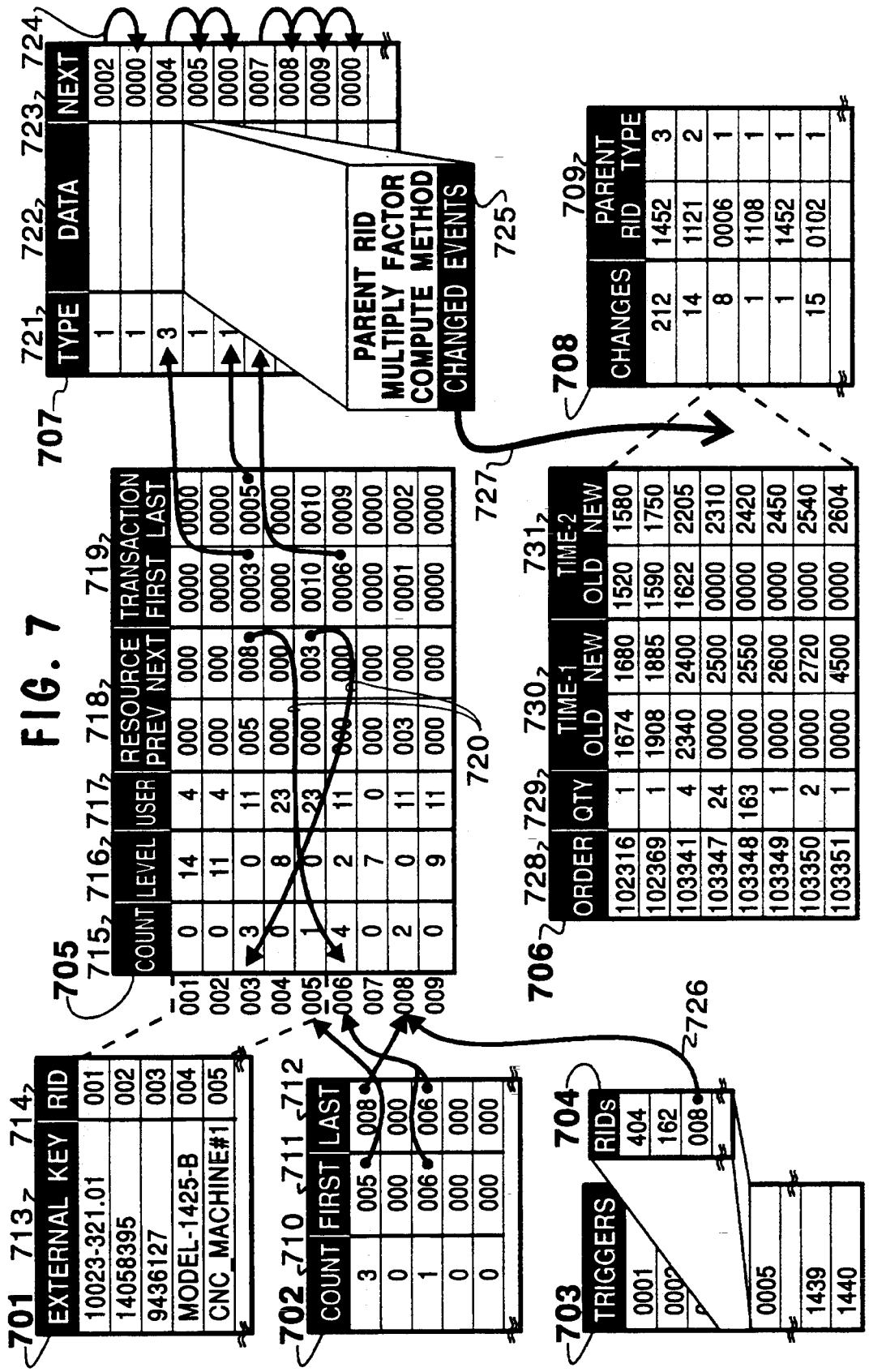
FIG. 7 is a series of temporary tables illustrating direct pointer references and data used by resource engine control methods.

Data tables (also known as arrays or structures) exist in two categories; temporary tables in FIG. 7 exist only during resource engine operation, while permanent tables in FIG. 8 exist after shutdown. Permanent tables includes resource specific data, hereafter referred to as resource tables, and all other referred to as system tables. Three data domains are described as follows:

1. Temporary Tables in FIG. 7.

Eight tables 701 through 708, connected by direct pointer references, contain control data for the continuous scheduling process. The logical construct shown in FIG. 7 is referenced by many of the resource components described herein. A cycle is started with the level 701, transaction 707, event change 706 & 708, and trigger 703 & 704 tables empty, and the resource 705 table pointers and counts set to zero.

INDEX/LEVEL/TRIGGER→RESOURCE→
TRANSACTION→EVENT CHANGE

When external command primitives are processed this creates "seed" entries from which all lower level dependent changes are created. Tables are re-initialized as processing proceeds, so they are returned to their initial state when each cycle is completed.

(a) The index table 701 contains a row for each unique resource external identifier KEY 713 and corresponding RID 714. When the internal RID is not known, this index determines its value.

(b) The level table 702 contains a row for each level value. Each table row contains a count of resources to be processed 710 for that level, and pointers to the first 711 and last 712 resources of that list.

(c) The resource table 705 contains a row for each resource corresponding to the resource identified or RID 714. Each table row contains the level value 716, and previous/next resource pointers 718 to other resources to be processed at that same level. This resource "chain" 720 identifies what resources have pending activity at each level. The resource table 705 references the transaction table 707. Each row in 705 contains a transaction count 715 for that resource, and first/last transaction pointers 719. New transactions added to 707 are added to the end of its resources' transaction list.

(d) The transaction table 707 contains multiple transaction types 721. One essential type is the dependent resource change described herein. One transaction is created for each dependent resource, containing information about the parent to child relationship 725 (structure), with reference 727 to the EVENT CHANGE table 706 where one or more changes to the parent's scheduled events are described.

(e) Event changes are described in two tables, the header 708, and detail 706. The header 708 identifies the resource whose scheduled event(s) changed 709, and the number of detail entries that follow 708. Each detail entry in 706 describes the time 730 & 731 and/or amount 729 shift of the parent's supply event change. This information is combined with the parent/child 725 data described by the transaction.

(f) The trigger table 703 is a linear array in which each entry represents an interval of time in the near future. For ordinary purposes this interval is one minute, and near term is 24 hours or 1440 minutes after engine start-up. Resource engine Component part 10 determines when a resource schedule's condition will change due to time passage. When this point in time is in the near future defined by this table, an entry exists pointing to a list of resources 704 requiring action at that specific time. In the following example four minutes after start-up resources 404, 162, and 008 must be added to the active processing lists for their respective levels 716. As time passes, resource engine component part 7 advances the time trigger pointer from the previous position and activates any resources found.

2. Permanent Resource Tables

FIG. 8 illustrates resource data comprised of table 801 and its subordinate parts. Information about each resource in 801 is retrieved, managed, and updated in its entirety by resource engine component parts. Each instance of a resource table contains resource characteristics 802, rules that govern its utilization 803, timing transforms 804, dependent resource requirements 805 (relationships), and events 806 of supply and demand.

(a) Characteristics 802 include the external (long form) resource identification (KEY), internal resource identification (RID), resource type, level value, user identification (UID), time when last updated, time of next trigger, current amount (Inventory), process yield factor, Units-Of-Measure (UOM), and of course a text description of the resource.

(b) Rules 803 include a calendar identification (CID), safety stock (buffer), minimum, maximum, and multiple amounts, fixed lead-time, firm interval, prior interval, and after interval. Prior interval determines when prior notices (output primitive) will be issued, while after interval determines when late notices will be issued. When multiple rules are defined each rule applies to a non-overlapping interval of the future time horizon. Each rule in succession defines the last point in time where the rule is applied, after which the next rule in succession is applied. The last rule, usually does not specify an end point. The capability of multiple rules by sections of the time horizon provides a mechanism for representing strategic, tactical, and operational schedules in a combined data set without replication and summarization. The use and benefits of this capability are described elsewhere.

(c) Timing data 804 is used by a preferred embodiment of the balancing component to precisely determine the time relationship between scheduled event quantity and lead-time, the time between scheduled event release and completion. Timing data transforms are specified as one or more points (x,y pairs) of quantity (amount) and lead-time. The specification of a fixed lead-time for all quantities is accomplished by specifying a single point with quantity zero. When multiple dependent operations exist and dependent resources are timed to supply each operation independently, such as the progressive build system, timing transforms are defined for each operation defined by the dependents tables. The first transform always represents the total required time for determining the parent's scheduled event, while subsequent transforms represent the dependent delivery timing for each dependent operation. Dependent resource structures with multiple discrete operations have multiple dependent pointer table entries. When additional timing offsets by dependent operation exist AND scheduled event quantities vary, dependent requirements changes must be fully described in each dependent change transaction.

(d) Dependent resources data 805 defines all dependent requirements for material and capacity consistently. A capacity resource (machine) can define material (tool) or capacity (maintenance) requirements, or visa versa, The representation of material and capacity events in schedules and determination of dependent demand event (requirement) amount is described herein. Only scheduled dependent resources are included in the resource database. History, product and process documentation, and all other data irrelevant to scheduling is eliminated. The units conversion component of the present invention compiles (pre-processes) dependent relationships, reducing the descriptive information and processing required at run-time. A relationship is defined by the dependent resource identifier (DRID), factor value, and calculation method code.

(e) Events 806 represent all activity on a continuous time horizon. Two classes of events, demand and supply, are further divided into event types. Demand events decrease the amount of resource available. Supply events increase the amount of a resource. The timing and amounts of events can be set manually or calculated by a scheduling process that considers all demand events, and rules. When supply events satisfy demand events without breaking any rules, then a schedule is in balance. Each demand event has data describing its reversed (child to parent) relationship to a source of demand. A quantified source of demand, called a peg by production planners, is essential to resource management problem resolution. Pegging is limited when separate systems are responsible for strategic, tactical, and operational resource management. Features of a preferred embodiment make integration practical, permitting true bottom to top pegging for a more global perspective in problem solving. The peg's dependent to source quantity is used during resource engine "START-UP" to identify and correct inter-level imbalances, assuring data integrity.

3. Permanent System Tables

FIG. 13 illustrates data NOT specific to a resource is contained within a system data object managed by resource engine components. This includes tables describing the existence of users, other resource engines, and the availability (calendar) and other rules that may apply to more than one resource.

Processing Resource Engine Command Primitives

The input stream to the resource engine is command primitive messages especially constructed for the purpose communicating facts relevant to resource management. Database, graphics, communications, and other engines communicate via protocols like SQL, GKM, and TCP/IP. Command primitive syntax, construction, and parsing methods are similar to programming and application source text or scripts. The choice of specific verb, constructs, and metaphor is unique and described herein. The essential logic is described FIG. 27.

The input stream is parsed for keywords, data, and logical grouping organized with balanced pair of delimiters. Data with spaces is enclosed in quotes. Temporary and permanent macros can be defined to aid entry and comprehension. Optional sequence numbers, headers, trailers, and time stamps control missing and duplicate data. This is all typical of a textural language compiler.

The resource engine input translation converts the command primitives into internally formatted transactions. The command language need not change when resource engine internals change. Transactions that reference a specific resource convert the external textural (long) key to a Resource ID (RID) by table 701 look-up, are added to the transaction table 707 and added to its resource's linked list in 705. All other transactions are processed immediately.

A calendar change affects both calendar contents and all the resources that rely on that calendar to determine resource availability. Affected resources are immediately added to the active processing list for re-balancing.

When input is available it is processed, with several exceptions. The control commands, STOP, STEP, START, PAUSE, and WAIT provide for orderly shut-down, diagnostic testing, and simulation. A method has been developed to create large volumes of primitives from parameters for functional and performance testing. Schedules generated from this data are then used to create an expected real-time transaction stream. In WAIT mode, the input process is suspended until the current time reaches the time stamp of the next transaction.

Processing by Levels

Dependent resource structure may be multi-level (recursive) characterized by number of levels (depth) and complexity (branching factor). A resource may have no, one, or many demands (requirements) and no, one, or many scheduled supply events (planned orders). Where resource dependency exists, any change in amount or time of a scheduled supply event, or the amount or timing relationship with a dependent resource, requires a restatement of the dependent demands. Multiple levels of dependency, each having hundreds of dependent materials and process operations are common.

Prior art net-change methods can compound the effects of changes, so that a single requirement change result in hundreds or thousands of dependent schedule changes. A preferred embodiment reduces compound effects by aggregating changes by level and resource, limiting processing time variability, and making continuous operation practical. Continuous resource management must maintain information consistency while changes are processed. Conventional net-change methods lock all dependent data for each logical transaction to assure logical consistency. When hundreds of thousands of change locks are performed per logical transaction, performance and data accessibility are severely impacted, and deadlocking is likely.

A preferred embodiment of the resource engine "caches" dependent changes in transaction 707 and event change 706 & 708 tables for subsequent processing. Processing is performed in relative level sequence so that supply and demand imbalance will exist only BETWEEN levels for the brief interval of time between the posting and processing of dependent changes, assuring information integrity for each resource.

A preferred embodiment manages resource information as an integrated unit to naturally maintain a consistent logical view of a resource schedule. Each permanent resource table 801 in FIG. 8 contains multiple sub-tables that describe resource characteristics 802, rules 803, timing 804, dependent relationships 805, and scheduled events 806.

The ability to recognize and correct imbalances is essential to continuous processing and fault tolerance. Dependent to parent relationships are stored in dependent demand event information so that inter-level consistency is assured during analysis. The "START-UP" Component 1 verifies data integrity and regenerates lost temporary tables.

Operation of a preferred embodiment does not depend upon level codes supplied by external systems such as Bills Of Materials (BOM). Tests have proven the method for processing by level provides correct results and achieves significant performance improvement.

A simple algorithm in FIG. 21 and data tables in FIG. 7 identify resources that require processing grouped by level. The translation of resource command primitives in component part 4 creates one or more "seed" entries in the transaction table 707, a linear or circular buffer in which fixed and variable length transactions are stored. The format of each transaction includes a preamble that identifies the resource (RID), an integer pointer value provided by component part 4, and a pointer to any next transaction.

The resource table 705 is checked to determine if any transactions exist for that resource in count 715. If count 715 is zero the resource table's first/last transaction pointers 719 are updated to point to the new transaction. Otherwise the new transaction is added to the end of the list 719. A doubly linked list is maintained so that processing of transactions will correspond to the sequence posted. The transaction count 715 is incremented.

If no prior transactions existed, additional processing may be required to "activate" the resource for processing. A resource is active when it is linked into a list 720 using previous/next pointers 718. A resource is added to a list corresponding to its level value in table 702, having a first 711 and last 712 pointer for each list. If the level table 702 resource count 710 for that level value is zero, then no list exists, and one is initialized. This doubly linked list (both previous and next pointers) accommodates the resource removal and insertion required for level value adjustment described in FIG. 22 sub-part 5.

A resource referenced by the trigger tables 703 & 704 will, as time passes, be added to a level's linked list without the creation of a transaction. When a resource is queued for processing, a lack of transactions indicates that some aspect of the schedule's condition has changed. Without transactions, no rules, demands and status can change, balancing is not required, and only a subset of regular processing is required.

Resource engine activity is reflected in the constantly changing resource and transaction counts for each level. A cycle begins with these tables empty. As transactions are added 707 and resources activated 705, the lengths of linked lists increase. Both command primitive processing and the dependent "explosion" of resource engine operation activates resources in table 705 and fills transaction table 707. Engine operation also de-activates resources in 705 returning pointers 718 & 719 and count 715 to their initial state of zeros. When the lowest level has been processed a cycle has been completed and the only remaining transactions are those of new primitives. When each cycle is completed the contents of 707 before a point is simply thrown away by resetting the circular buffer start pointer.

Parallel Processing by Levels

The present invention originally contemplated an alternative net-change prospective scheduling method that would utilize the power of symmetric and massively parallel computers. Conventional net-change methods create highly variable and unpredictable processing times for each logical transaction, and can not predict deadlocking.

The method for processing by level described herein allows multiple processing streams for each level processed. Scheduling of any number of resources to any number of processors is simple. Relative process times can be estimated by physical resource's data table size. A schedule with many events and few dependents, or the inverse, require approximately the same work. Arbitration between processors is not required, but all parallel streams must complete before starting the next level.

An initial prototype demonstrated that processing by level when used in conjunction with the other enhancements of the present invention provided such dramatic performance improvement that for most applications parallel processing was not required.

The methods of a preferred embodiment support a multiple client/server topology in which both processing and data can be physically distributed. This achieves processing throughput and fault tolerance with ordinary computing and communications apparatus.

Determining Requirement Changes

The methods of the present invention improve the realism of resource schedules by improving the representation of amounts and timing. A preferred embodiment improves performance through methods that pre-compile data to eliminate unnecessary repetitive computations, and by reducing the number and size of data elements required at "run-time".

Methods of a preferred embodiment do NOT perform table searches at run-time, compared to as many as three unit of measure table searches for each parent/child pair. The methods for determining dependent amounts and timing are illustrated in FIG. 15 through FIG. 19, essential logic described in the pseudo-code of FIG. 24 & FIG. 25, and are discussed in the following text.

Processing by level is commonly used for initial (not net-change) schedule generation and produces a large transactional data volume. Transaction volume is the mathematical product of the parent's scheduled events changed and number of dependent resources. The multiplying process is a source of geometric performance degradation. This effect is avoided by separating the two elements of the product: 1) The parent's scheduled event changes in FIG. 7 table 706, and 2) The dependent relationship in the transaction table 707. Each transaction table entry references its dependent resource relationship 725 and points 727 to the event change table where its parent's event changes are defined.

As the transaction's resource is processed in the resource engine FIG. 6 component part 9, these two tables are combined. This combination process is repeated for each of multiple dependents. This logical separation reduces data volume by combining data when retrieved rather than when generated. The essential logic is described in FIG. 27 sub-parts 2 and 5.

The event change table 706 typically represents one percent (1%) of the data volume of transactions that fully described each dependent change. The relationship amount information 725 in the transaction is easily obtained from a parent's dependent relationship data 805. At run-time event change table 706 entries provide information essential for reconstruction of lost temporary data tables 702, 705, & 707.

Using a conventional approach, a resource schedule with 200 requirements (demand events) is translated by simple lot sizing rules into 100 scheduled supply events. One hundred (100) dependent resources (materials and process) are needed to make it. A change to the first requirement would change all 100 supply events, and for each supply event the corresponding 100 dependent requirements; a total of ten-thousand (10,000) dependent requirements would change!.

A preferred embodiment places 100 entries in the event change table 706, and 100 entries in the transaction table 707, for a total of 200 entries. Each entry contains one-half the data, so only one percent of the storage is required. Experiments have demonstrated that avoidance of allocation, creation, access, and deletions can reduce processing time by at least 90%.

Determining Dependent Amounts

Exploding parent to dependent requirements is critical to high performance and correct consistent results. A preferred embodiment of the resource engine can process diverse resource types with potentially complex units conversion and rounding. The present invention contemplates infrequent relationship changes relative to determination of dependent amounts.

Figure 19:
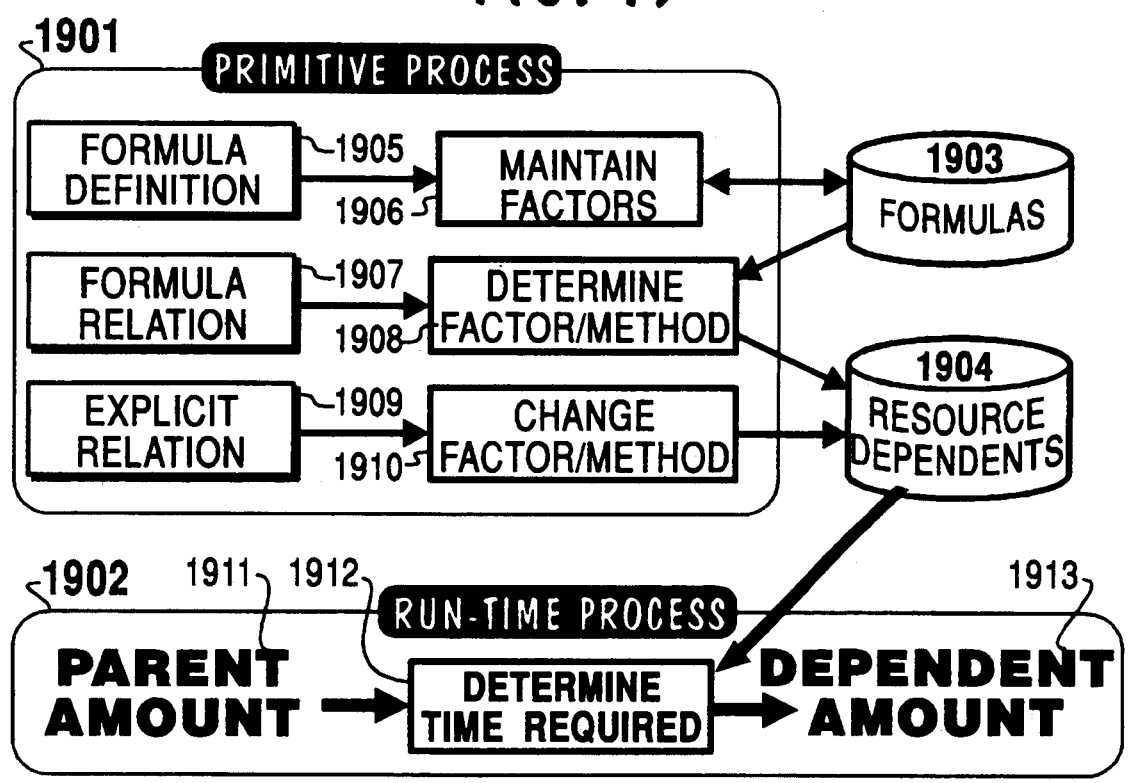
FIG. 19 is a block diagram illustrating methods used to determine dependent resource amounts.

FIG. 19 illustrates a two part process comprised of a compilation of command primitives 1901 and computation of dependent amounts during "run-time" 1902. The essential logic is illustrated in FIG. 24. A preferred embodiment of the resource engine 601 component part 4, LOAD NEW MESSAGES, parses command primitives 1907 & 1909 for definitions of "DEPENDENTS". When command primitives define or change dependent relationships, the compilation 1901 provides a factor (ratio) and computation method code describing how to convert parent to child amounts and stores the computed result within the parent's resource data table 1904. This information remains unchanged until new primitives change this definition.

Relationships are defined by an integer or floating-point ratio and a method code that identifies the method to use at run-time 1902. These values can be defined with an explicit relation primitive 1909 using key words R (Ratio) and M (Method), or by a formula relation primitive 1907. A preferred embodiment uses predefined formulas for which formula parameters 1903 may be used for specific units conversions. Keyword F (Formula) 1905 is followed by a value that is processed by 1908 using a pre-defined formula 1903 to compute a ratio and method. The present invention contemplates that a process can be devised to interpret primitives and develop formulas in a single step.

```
RESOURCE MOD221-B
  ADD DEPENDENTS {A5662-1
    1001.133{QTY=21}
    1001.162} . . .
```

Change affectivity and substitution of alternate resources can also be specified through primitives. In this example a new assembly version should be scheduled as of Apr. 31, 1990 at 2P.M., but if the new version is not available, then use the old version. Sharing, exclusive, split, and alternates are other subordinate relationships that can be applied to the use of the dependents.

```
RESOURCE MOD221-B DEPENDENTS
  {CHANGE A5662-1 TO A5662-2 ON 4/31/90 14:00
   SUBS   A5662-2 FOR A5662-1
   SPLIT  PAINT_BOOTH_1 & PAINT_BOOTH_2
   ALT    BRASS_NUT_6-32 FOR SS_NUT_6-32}
```

The following Example shows how a command primitive is "compiled" to obtain a list of dependent resource's internal ID, and factor/method values required for "run-time" calculation of dependent amounts. Each dependent resource is converted by "look-up" to an internal resource identifier (RID), used as a direct pointer for many operations.

```
. . . ADD DEPENDENTS
  {A5662-1
   1001.133{QTY=21}
   1001.162
   FINISH21 {QTY=15,EADDZ} } . . .
```

The last dependent FINISH21 has QTY=15 with "EADZ", a macro that expands to F=11/0.083333 or "use formula #11 with a factor of one-twelfth (0.083333)", resulting in METHOD=3 and FACTOR=(15 * 0.083333) or 1.2499.

Compiled results add, change, or delete the permanent resource table data illustrated in FIG. 8. The dependents tables 805 contains one entry for each operation that references one or more dependent definitions. The simple table 807 assumes each parent uses quantity one of each child and these relationships do not change in the future. Amount relationships other than 1 for 1 are defined using factor & method in table 808. If a dependent relationship varies with time, table 809 defines the relationship and a time interval.

The "run-time" process 1902 (part 2) is accomplished frequently during the scheduling process providing a dependent demand amount from a parent supply amount, factor and method. The method determines if factor is an integer or floating point value, and selects the method used to determine dependent amounts. This provides a conversion between units of-measure without table look-ups, with correct rounding. The present invention contemplates methods can improve performance by eliminating unnecessary operation. Method 0 achieves a one for one integer relationship by assigning the parent quantity to the child. An explosion for the above example performs two value assignments, one integer multiply, and one floating point multiply with appropriate rounding.

Determining Dependent Timing

The time between an activity start and complete (factory order release and delivery) is lead-time. If both machine set-up and per piece times are defined allows calculation of lead-time for each lot size. Routings are product specific, so 100 products that required just 20 process steps each would require 2,000 set-up and per piece times. Capture of detailed process timing data is often impractical, and there is no way to evaluate this information to accurately predict future processing times. Large volumes of accurate routing data would be necessary to calculate lead-time by a longest path or other method. Time compression realized by expediting or reduced transfer batch size would be ignored.

A preferred embodiment of the resource engine balancing component part in FIG. 6 uses a time transform method illustrated in FIG. 15, FIG. 16, FIG. 17 and FIG. 18, is a simple and fast method to accurately determine lead-time as a function of quantity (amount). If multiple transforms are defined, determines the delivery requirements of dependent resources at multiple points within a process, eliminating the need for phantoms, and fully accommodating progressive build and process manufacturing.

In FIG. 15 each transform is an array of one or many points (x,y) defining zero, one or many line segments 1506. The timing table consists of one or more points (x,y) defining y=f(x), or lead-time (1t) as a function of quantity (qty). A single point is the equivalent to fixed plus variable lead-time 1504. Multiple points define multiple operations in complex serial/parallel combinations with varying transfer batch sizes 1507 & 1510.

The determination of lead-time is done once per event, amounting to hundreds or thousands of times for each resource. The potentially complex process of compiling a lead-time transform is performed once when a resource is defined.

FIG. 17 describes three different methods for determining leadtime transforms:
1. Values of each point (x,y) are defined explicitly by command primitives. Values are determined by the user by estimation, simulation, or other means.
2. Values are determined by analysis of a process network to determine lead-time as a function of quantity using the following rules and formulas illustrated in FIG. 15 and FIG. 16:
    Any series of sequential fixed or variable time operations 1504 is a linear function of time, and can be computed by the formula LT=FSUM+(-QTY*VSUM) 1505, where FSUM is the sum of all fixed operation times, and VSUM is the sum of all variable operation times.
    Any parallel fixed or variable operations 1506 are a linear function of time, and can be computed by the formula LT=MAX[FMAX,(QTY,VMAX)] 1508, where MAX is a function that determines the maximum of two numbers, FMAX is the greatest fixed operation time, and VMAX is the greatest variable operation time. A special case exists when FMAX is not greater than VMAX, because for all integer quantities (QTY) greater than zero, FMAX will never be greater than QTY multiplied by VMAX, so the factor FMAX and the MAX function are eliminated, resulting in the simplified expression LT=QTY*VMAX.
    Any combination of sequential and/or parallel fixed or variable time operations 1510 can be computed by a formula 1511 which expresses the fixed and variable lead-time components consistent with the above two rules.
    In FIG. 16, any series of sequential operations in which transfer quantities (batches) 1602 are less than the entire quantity 1601 can be computed by formula 1605.

The method used to develop the points (x,y value pairs) is similar to a convention longest path routing analysis, where the network is parsed backwards, and only the longest (time) paths are considered.
3. In FIG. 17, values can be determined by experience 1706, using the actual elapsed time (y) for the completion of a quantity (x) using its calendar to determine the actual available elapsed time 1707. Any number of line/curve fitting methods 1709 can be used to determine if an existing transform 1710 should be altered.

Lead-time is determined at run-time for the specified quantity using the time transform 1710 data and algorithm 1714. It is contemplated that a check for same quantity will eliminate repeated calculation for scheduled events of the same quantity.

Figure 18:
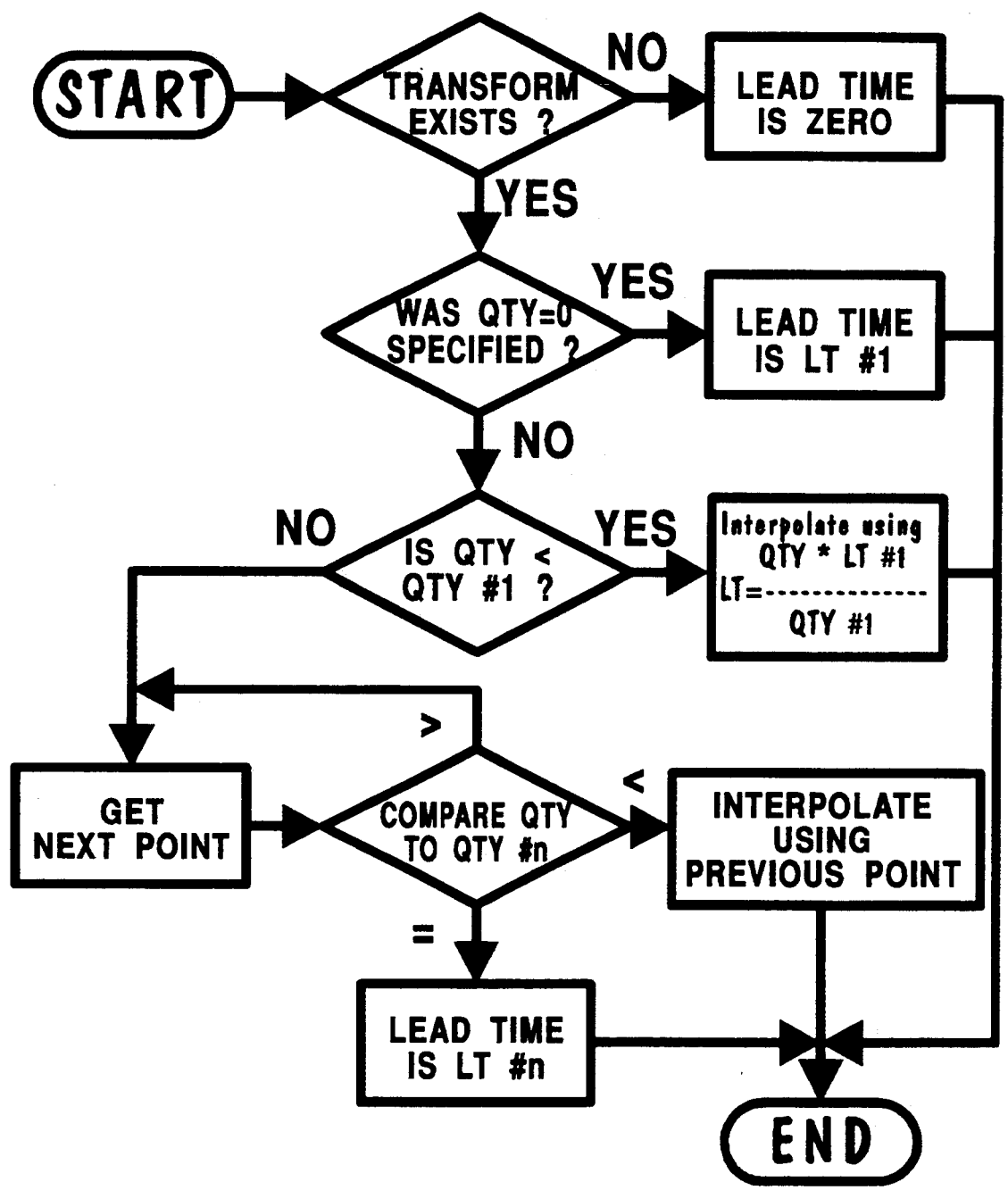
FIG. 18 is a flow chart illustrating the method of a preferred embodiment used to determine lead-time from scheduled event quantity by use of timing transform data points.

The flow chart in FIG. 18 and the essential logic of pseudo-code in FIG. 25 illustrates the timing transform process. When quantity is less than the quantity of point #1 then use formula:

$$\text{TIME}_{LEAD} = \frac{(\text{QUANTITY} * LT_1)}{QTY_1}$$

Otherwise each successive point is checked. If a quantity match is found, the corresponding lead-time is returned. If the quantity specified is less than the current points quantity or all points have been compared, then the interpolation/extrapolate formula is used.

$$\text{TIME}_{LEAD} = LT_{n-1} + \frac{(QTY_n - QTY_{n-1}) \times (LT_n - LT_{n-1})}{QTY_n - QTY_{n-1}}$$

Maintaining Relationship Lowest Level Values

A preferred embodiment uses a method for relationship lowest level values that eliminates time consuming maintenance in other systems, and improves resource engine throughput. Level values are required to assure that dependent resources are balanced after their parents. Resource table 705 has the current lowest level 716 value that determines which level's linked list will contain each resource. This value is initially zero (the highest logical level) and may over time be adjusted to a higher value. When dependent resource transactions are created, any dependent resource whose level is not a lower logical level is changed to one lower than the current parent.

The essential logic is described in FIG. 22 sub-part 5. When a resource's level is changed, the resource must be removed from its old level table linked list 720, and added to the new value's list. If the level in the temporary resource table changes, the permanent value in its resource data object will be updated when dependent transactions for that resource are processed.

Managing Time Passage Effects

Time passage processing is necessary for continuous real time resource management. The resource engine methods of FIG. 6 identify the next point on the future time horizon for every resource schedule whose condition will change if no further activity takes place. The condition of a resource schedule is represented by action message codes by type, count, and a problem priority determined by defined rules. As time passes, a direct machine response, or notification of a key decision maker responsible for this resource is required. When a resource schedule has multiple triggers, these methods may create a new trigger as previous triggers are recognized.

In the example of FIG. 7 each entry in the trigger list table 703 represents a one minute interval and points to a second list of resource ID's with the same trigger value. Whenever a time trigger is created, or changed within this near horizon these lists are altered. Any past due triggers are not added to these tables, but are posted directly for processing. Resource engine in FIG. 6 includes:

1. At resource engine "START-UP", component part 1 creates two temporary data tables 703 & 704 used to manage time passage triggered actions in the near future. The then current system date & time is saved as the BASE CLOCK value. As component part 1 reads through all permanent resource tables 801 to validate them, any resource with a trigger less than the BASE CLOCK value are immediately triggered. Any near future (24 hours shown as 1440 minutes in 703) triggers are converted to a pointer value by computing minutes after the BASE CLOCK value, and the resource RID added to table 704. Essential logic is described in FIG. 20.
2. Resource engine component part 10 creates a trigger value for this future point in time as described in FIG. 23. If the computed trigger value is different than a previously computed value, and the old value is within near term it must be removed from the TRIGGER table. If the new value is within the near term it must be added to the TRIGGER table.
3. Resource engine component part 7 determines when action from a trigger is required as described in FIG. 21. As time passes a pointer moves down the trigger table. Any non-zero entries between this new position and the previous position constitute "new triggers". As the end of the 24 hour period approaches, an opportune time is found to repeat the array initialization extending the 24 hour "near term" window.

Logical Consistency & Recovery

Logical consistency is assured by physically writing an image of resource information to disk when processing is completed. Recovery relies upon an audit trail and logic imbedded in the resource engine's logic. Recovery of the contents of all memory resident tables is assured by the selective retention of event change information in the history table, which serves as an audit trail.

Resource engine component part 6 creates audit file entries at the end of each level that include all primitives transactions, statistics, checkpoints, and new entries in the event change tables 706 & 708. If the table was checkpoint entry then the resource engine was shutdown in an orderly fashion, either while sleeping, or as a result of an intentional shutdown. Resource engine "START-UP" component part 1 examines the audit history file to determine if the last entry was a "checkpoint". Otherwise dependent changes are assumed lost and are recovered in the course of the first cycle by selectively generating verification transactions in 707 and parent supply events in tables 706 & 708.

Rule Based Balancing

Rules defining resource's constraints in amounts 803 or timing 804, govern how scheduled events are sized and timed in response to demands. The time horizon is divided into sections with different rules for each section. A single schedule can have short term rules for JIT, and long term rules for strategic planning.
1. Intervals, shown in FIG. 5 504, control the number of scheduled supply events by treating a section of the time horizon 511 as a single point in time. Demands within a supply interval are combined to compute supply events.
2. Variable lead-time as a function of supply event amount (amount) using on of several methods of FIG. 17.
3. Calendars determine valid start and stop date/times, persistence, time resolution, etc.

Schedule Balancing

Figure 14:
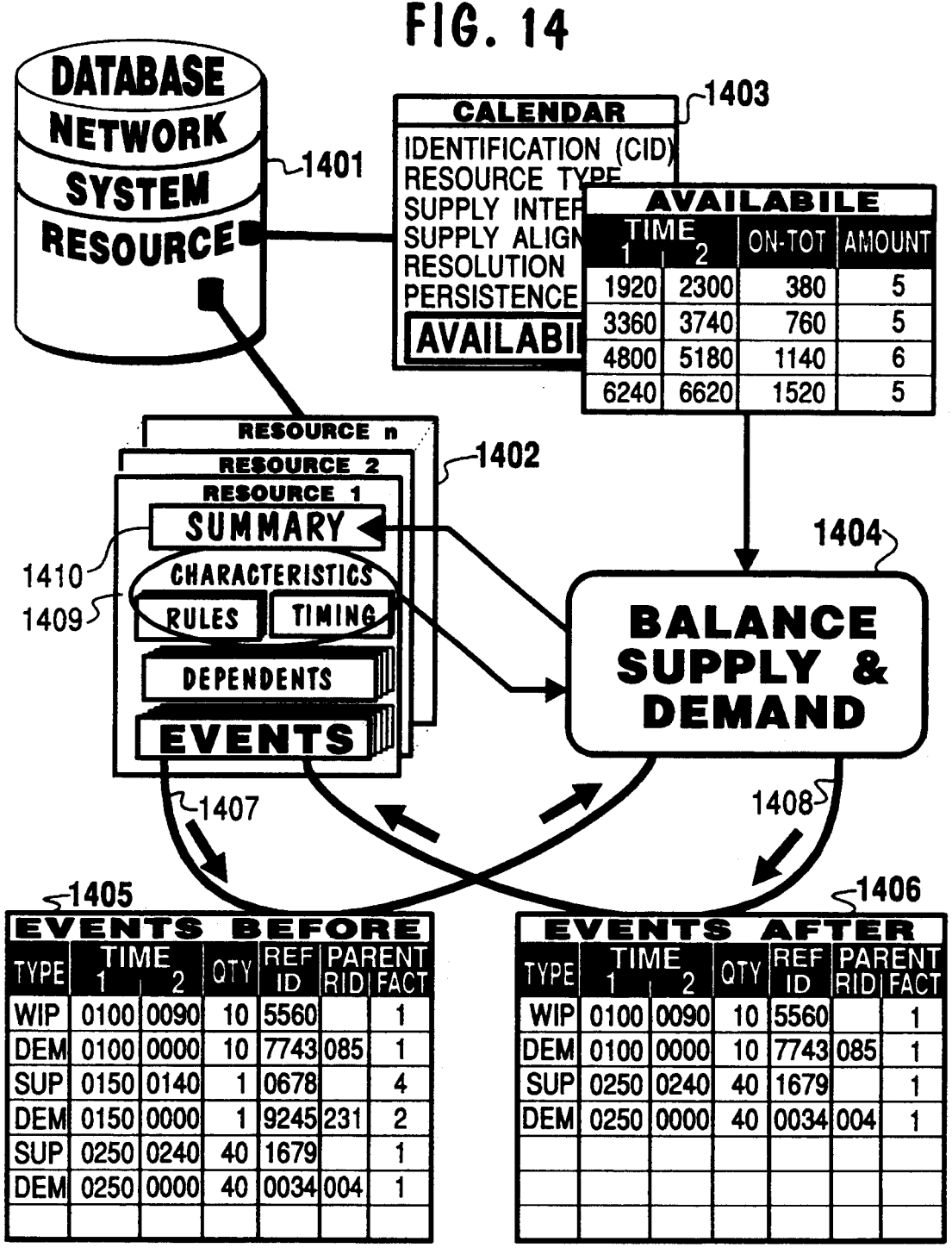
FIG. 14 is a series of tables and charts illustrating balancing using availability (calendar), timing, and amount definitions.

A simple balancing example is shown in FIG. 14 where a demand event from parent RID 9245 is canceled. In preparation for balancing the current resource data table is retrieved from the database 1401 and characteristics, rule, and timing information 1409 is examined by schedule balancing method 1404 to determine the appropriate calendars. Calendars 1403 define the availability of the resource being balanced and determine supply event positioning and constraints. Calendars are similar to resources describing an amount as a function of time 1403. Characteristics 1403 describing how this resource may be used, time line resolution, supply interval size, persistence, and other factors constraining supply event positioning.

The event table is retrieved 1407 and essential logic described in FIG. 23 is applied until all table events are evaluated. If the events table was revised it replaces the original copy 1408. Summary information that includes the trigger time, counts of errors by type, the worst error condition, and a code determined by define rules to represent the relative condition of the schedule is updated 1410. When the trigger time changes and is within the "near future" as defined at start-up, then time passage maintenance is performed for tables 703 & 704. When the condition value changes, a message is sent to the user's action control to revise its action list. Dependent changes are recorded in tables 706, 707 & 708.

The following description is a less technical summary of
1. Previously scheduled events are initially ignored.
2. The total of all event quantities within the current interval 510 is computed (firm+open—requirements−allocation −forecast). When the duration is positive (a rate-type resource) quantity is multiplied by duration.

3. If an event duration goes past the current interval, the remaining portions are retained on a temporary list and are treated as new entries in the resource's event data table when subsequent intervals are processed.

4. As each interval's processing is completed, the next interval's position is determined by calendar/rules. The current resource balance is either carried forward or reset depending upon the type of resource. Capacity-type resources set the interval's available resource to the amount of that resource available for the present supply interval (8 hours per shift). Materials-type resources (no duration) carry forward any previous amount (inventory).

5. As each interval is completed, the shortage quantity is determined and reduced by the amount(s) of any future committed supply orders.

6. Supply event calculation rules are applied to the shortage quantity to determine the event's time. If a fixed amount rule (a maximum amount) leaves a shortage uncovered, then multiple scheduled events are created until the shortage is eliminated. Scheduled supply event quantities are added to the current interval's total.

7. Previously created supply events, identified by unique numbers, are re-used by adjusting their date/time and/or quantity. As required, new supply events are created and an identifying number assigned. Existing supply events that are no longer required are removed.

8. The resource engine is responsible for managing effects that changes in supply events have on dependent resources. To assure logical consistency, changes to dependent resources are accumulated as pending transactions. When supply events are added, deleted, or changed, they are recorded in the event change table. Each transaction references these event changes, and the product of both creates all dependent changes.

ACTION CONTROL

Figure 9:
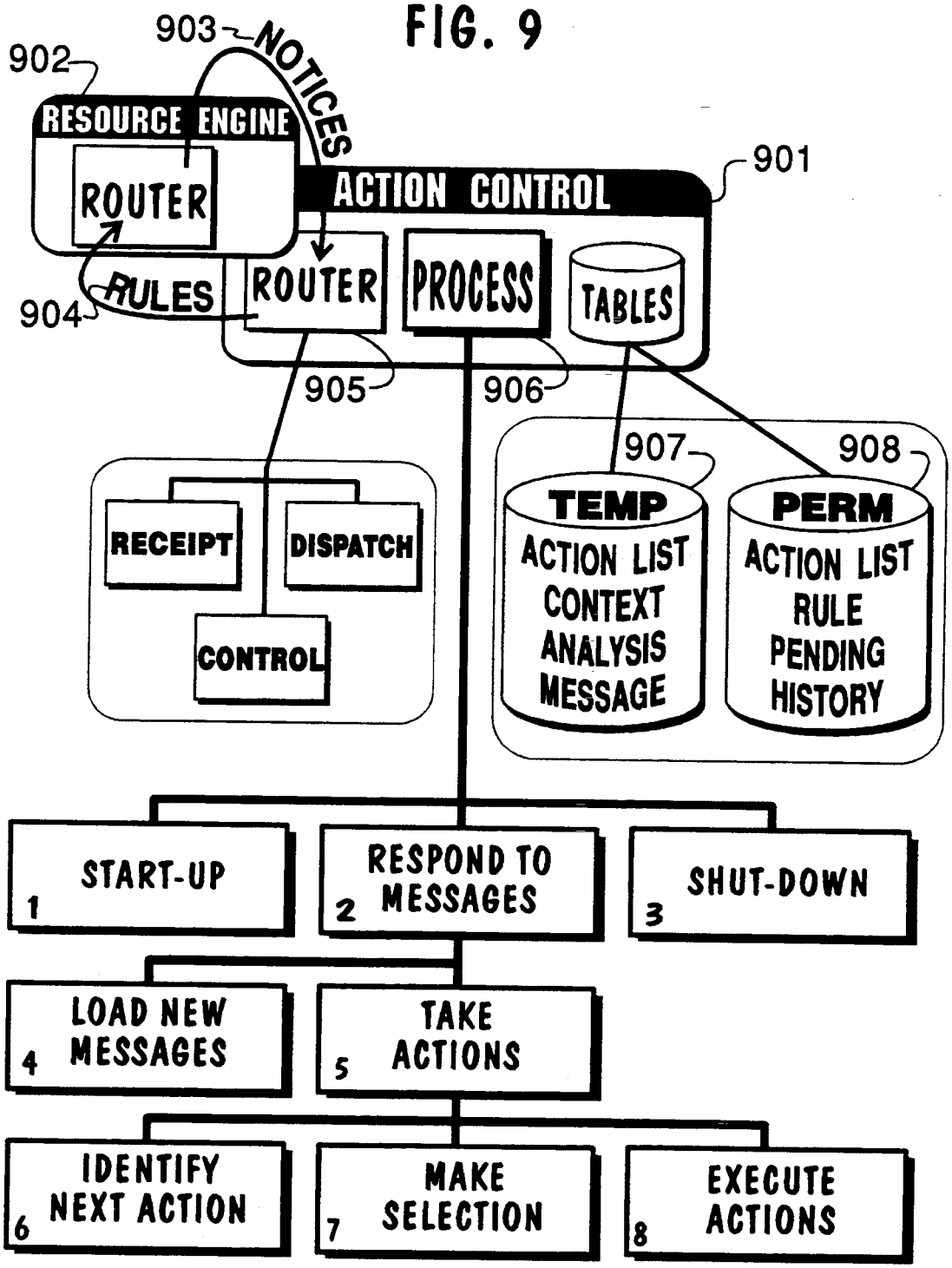
FIG. 9 is a chart illustrating the arrangement of component parts and data tables in the action control main component.

In FIG. 2 the present invention contemplates that a system for real time continuous resource management requires a means to maintain schedules and identify conflicts 203 and a timely method for resolving those conflicts 202. In FIG. 9 a preferred embodiment of the resource engine 902 provides notice messages 903 to the action control 901. A preferred embodiment of the action control manages the response to these messages through actions 904. Together, they provide a capability to respond in real time to changing requirements and the availability and constraints of resources. The responsiveness of the control and feedback loop that exists between the resource engines and action controls is determined by their respective latency.

In a preferred embodiment, the action control provides mechanisms that support three phases of a decision process to; 1. Establish priority, 2. Identify alternatives and assist in selection, and 3. Implement indicated actions.

| DISCOVERY | DECISION | ACTION |
|---|---|---|
| - Identify needs | - Obtain relevant facts | - Who must know |
| - Prioritize information | - Organize & Present | - What |
| | - Alternatives & Weights | - Communicate |
| | - Make a choice | - Verify action |

The action control conforms to the object design and client/server paradigms with all inputs and outputs expressed as messages. A preferred embodiment has been implemented in software for a general purpose computing device. The action control methods defined herein may be implemented in hardware, firmware, or software, and communication to the operator may be visual or auditory, and response by any means. The methods of the present invention contemplate the use of artificial intelligence methods to optionally replace the operator's selection of alternative actions.

Operation of one or more resource engines will in due course create messages describing conditions that require actions. All resources scheduled by any resource engine will, by default, send messages to the identified user's (decision maker) action control as described herein. If no intervention or decision is required the user may define parameters (rules) for the resource engine to selectively re-direct notice messages directly to the equipment (manufacturing machine, conveyer, etc.) or information system agent controlling such operation.

As an example of action control a user may send a message to one or more resource engines to alter the destination of order release messages to a Computer Integrated Manufacturing (CIM) system. A preferred embodiment "time passage processing" method will now direct order release request messages to the CIM system, an external agent. The CIM system in turn releases materials and starts processing.

Resource engines create messages providing advance and late notices of supply events, rule violations, etc., but do NOT attempt to describe ALL present and prospective conditions requiring actions. Instead, messages describe problems that have changed the overall condition of a resources schedule. If a resource schedule has no exceptional conditions, but as time passes an anticipated completion of work in process does not happen as scheduled, then the resource engine managing that schedule sends a message to the user's action control stating this fact. As time continues to pass, the severity of this condition may change and another message is sent to replace the previous message, describing the more severe situation.

The action control has read-only access to one or more resource engine databases. The action control evaluates the nature and severity of notices received to establish a preferred sequence of actions that is continuously maintained. Through either manual or automatic means focused information is obtained, evaluated, and actions defined. The action control automatically creates action messages using parameter tables and a predefined procedure for each unique combination of notice received and action alternative. These action messages are directed to one or more resource engines for implementation.

A preferred embodiment of the action control 901 shown in FIG. 9 is comprised of two major component parts. The first component part is a router 905 identical in construction to the router of the resource engine 902. The second major part is the action control process 906 consisting of 8 component parts that determine priorities of pending messages, select the most appropriate action, and construct messages for direct or indirect action as follows:

1. The "START-UP" component part reads a definition file whose parameters describe the user preferences and the location of the primary resource engine. Read-only access to that engine's permanent tables identifies and validates the user, encrypted password, etc. and provides global visibility into other resource engines and action controls. All senders of messages are advised that this action control is operational, and any of their pending actions should be sent. As these actions are received, they are arranged in an ordered linked list as determined by predefined parameters.

2. The "RESPOND TO MESSAGES" major component part, described more fully in action control Methods 4 through 8 below, provides a means to update the action list and manage the processes of discovery, decision, and action.

3. The "SHUT-DOWN" component part notifies all potential sources of messages that the action control will be shutting down, so that message senders will know immediately if messages will wait in their dispatch queue. Otherwise the sender's assumption would be that the receiver is waiting. This process closes files, breaks communications links, and terminates processing in an orderly fashion.

4. The "LOAD NEW MESSAGES" component part interprets command primitives and either replaces, adds to, or deletes from the action list. The action list is maintained as a permanent table of the action control, and a temporary table is maintained continuously as messages are received and acted upon.

5. The "TAKE ACTIONS" component part is comprised of components parts 6, 7, and 8 described herein.

6. The "IDENTIFY NEXT" component part obtains either the next action item on the ordered list, or one explicitly identified by the user. In FIG. 10 the action list 1001 is potentially large and changes due to continuous operation of resource engines. This method of a preferred embodiment of the action control 901 determines what should be acted upon next. A conventional database management and query solution would be inefficient and untimely. The strategy used by the resource engine 601 to dispatch notices is to send a single message summarizing a schedule's condition when it changes significantly. The same strategy is employed by the action control 901. The user (operator) is only notified when the contents of the action list changes significantly. A menu provides maintenance functions that construct reference tables of FIG. 11 to establish the rules for the behavior desired for each user. Much of the apparent intelligence of the action control is achieved by simple logic and data in these tables. The action list is roughly equivalent to an electronic mail in-box but requires functions not normally provided.

7. The "MAKE SELECTION" component part determines for the present action list item the list of potential actions and a single preferred action. A preferred embodiment employs a simple table to determine by notice code the most likely action.

The present invention contemplates the use of artificial intelligence technology to provide more reliable and even automatic selection of the best alternative action. In support of the selection process a focused or directed analysis is provided as shown in FIG. 10. Focusing is the filtering of information by considering the current context.

8. The "EXECUTE ACTIONS" component part illustrated in FIG. 11 translates the simple act of selection into one or more action messages using the indicated procedure 1110. The context of the action list item any focused analysis determine the destination and content of action messages. A message action includes the context and any performed analysis as reference information with the actual message text.

Permanent Tables

Figure 11:
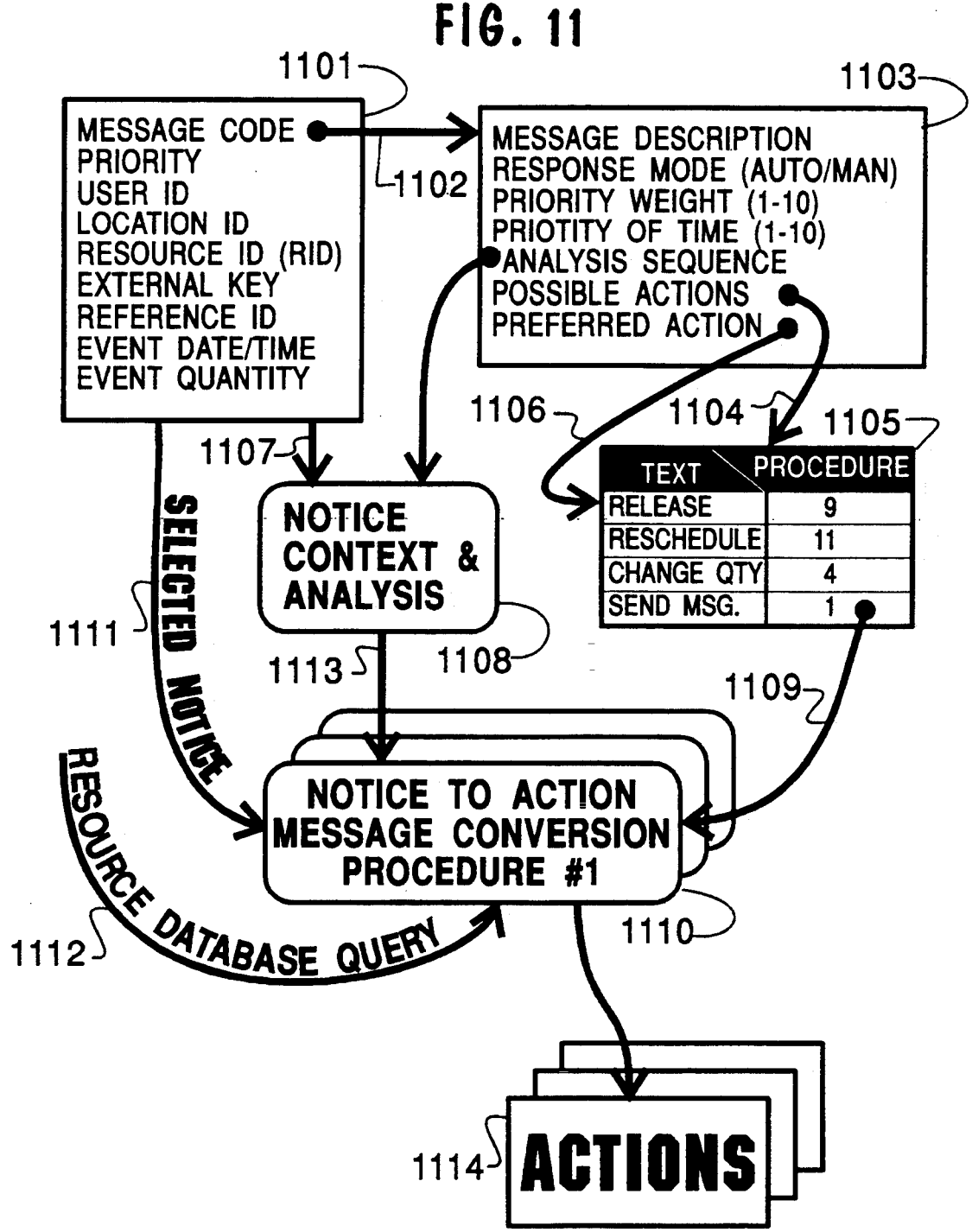
FIG. 11 is a series of tables illustrating the arrangement and use of tables used by the action control main component.

FIG. 11 illustrates permanent tables and process within the action control. The action list 1101, describes characteristics of each message code in 1103, and a list of alternative actions in table 1105 for each message code. The routing component uses the permanent tables of the resource engine to identify all resource engines and action controls in the system. Remote read-only access 211 is provided to the resource database. Temporary tables 1108 contain cursor positions, context information, and the textural contents of any analysis performed on the current action list item.

Focused and Directed Inquiry

As shown in FIG. 10, the action list 1001 identifies the current user, number of actions pending, and any message routing failures. The list is ordered by aggregate priority code 1002, and is continuously revised as new messages are received and actions are taken. An auditory signal and heading content indicates the receipt of a message that has changed action list contents or sequence. The action list cursor 1003 is initially positioned to the first (most important) action item, and may be positioned by the operator to any other action item. For each action item in the action list table 1101 in FIG. 11, the message code is used to reference 1102 the message parameter table 1103 that provides descriptive information and parameters used to determine action sequence. A simple criteria is an ordering of actions by message type only. A preferred embodiment of the action control contemplates the use of diverse methods including weights and filters developed by neural network methods. For each message code a unique list of alternative actions is described in table 1105, as referenced by 1104, and the preferred alternative provided by reference 1106. In FIG. 10 the action item selected by cursor 1103 references by 1004 an action selection list 1005 with a preferred selection pointed to by cursor 1006.

This first phase of focusing then requires selection of one item from list 1005, the rows of table 1105. As determined by the response mode in 1003, the selection is either automatic by default or analysis, or manual by operator selection. The preferred selection is highlighted. Priority is determined by permanent tables that identify for each notice type the alternative and preferred actions, importance relative to other notices, and other sequencing criteria. The cursor may be positioned by the operator to any action list item, and the list of alternative changes to correspond to that notice type.

Summary information included for each action list item in 1001 includes the real world (external key) resource identification, in a distributed resource management environment where the same resource is segregated due to geographic or other constraints, the location is shown, and a customer/factory order identification is provided with date and quantity required.

A single key, mouse click, or equivalent action provides a focused or directed inquiry 1007 that uses information on this line to provide the next logically relevant query as determined by the analysis sequence define in 1103 for each message code. Analysis information is obtained by remote read-only access to the resource engine database, and the access to other databases is contemplated. In a preferred embodiment, additional information is displayed along with the context used to obtain it 1109. Multiple levels of directed inquiry have been represented by tiling or other graphical methods. A mirror image of all such analysis is maintained in a temporary data area 1108.

Action Selection and Message Generation

In FIG. 11, any operator selection uses table 1105 to determine the procedure to execute. The specifics of each procedure 1110 determines what and how information 1111, 1112, or 1113 is used, and what, if any, action messages 1114 are created. The example illustrated in FIG. 10 shows an operator sending a message to another operator. The destination may be specified explicitly or derived from the current context of 1108.

If analysis indicated that the underlying problem is equipment failure managed by another operator, a short text message is directed to that destination with context and analysis information describing the problems created by the equipment failure 1114. Sending a message may require no actual data entry, but received messages are always complete and well structured from context and analysis 1113.

In reviewing action list items an operator may decide to take no action, and may specify some future time when, if that message persists, the operator should be notified by reminder text. This again differs from the operation of conventional mail/reminder in that if conditions change the action list item may disappear.

A preferred embodiment contemplates the ability to identify multiple action list items that are logically related, releasing these actions as a single group of action messages. Actions taken but not released as messages are highlighted and summarized in a count.

A preferred embodiment contemplates access to other information systems data and facilities as part of this analysis process.

Managing Control Primitives

A preferred embodiment router component is used by all resource engines and action controls to exchange messages. The router is an essential component of a preferred embodiment required for distributed processing.

FIG. 13 describes systems tables that describe "who I am" in table 1302, the user "nodes" in table 1303, and the communication paths between those nodes in table 1304. Each table describes the attributes required for receipt, dispatch, and control of messages throughout the system. Control primitives are provided for the initial definition and processes provides for the replication of these systems tables so that any user can identify and communicate with any other user.

A control sequence number in the path table 1304 assures that messages are received in sequence without loss or duplication. A message history 1305 assures that lost messages may be re-sent upon request.

Figure 12:
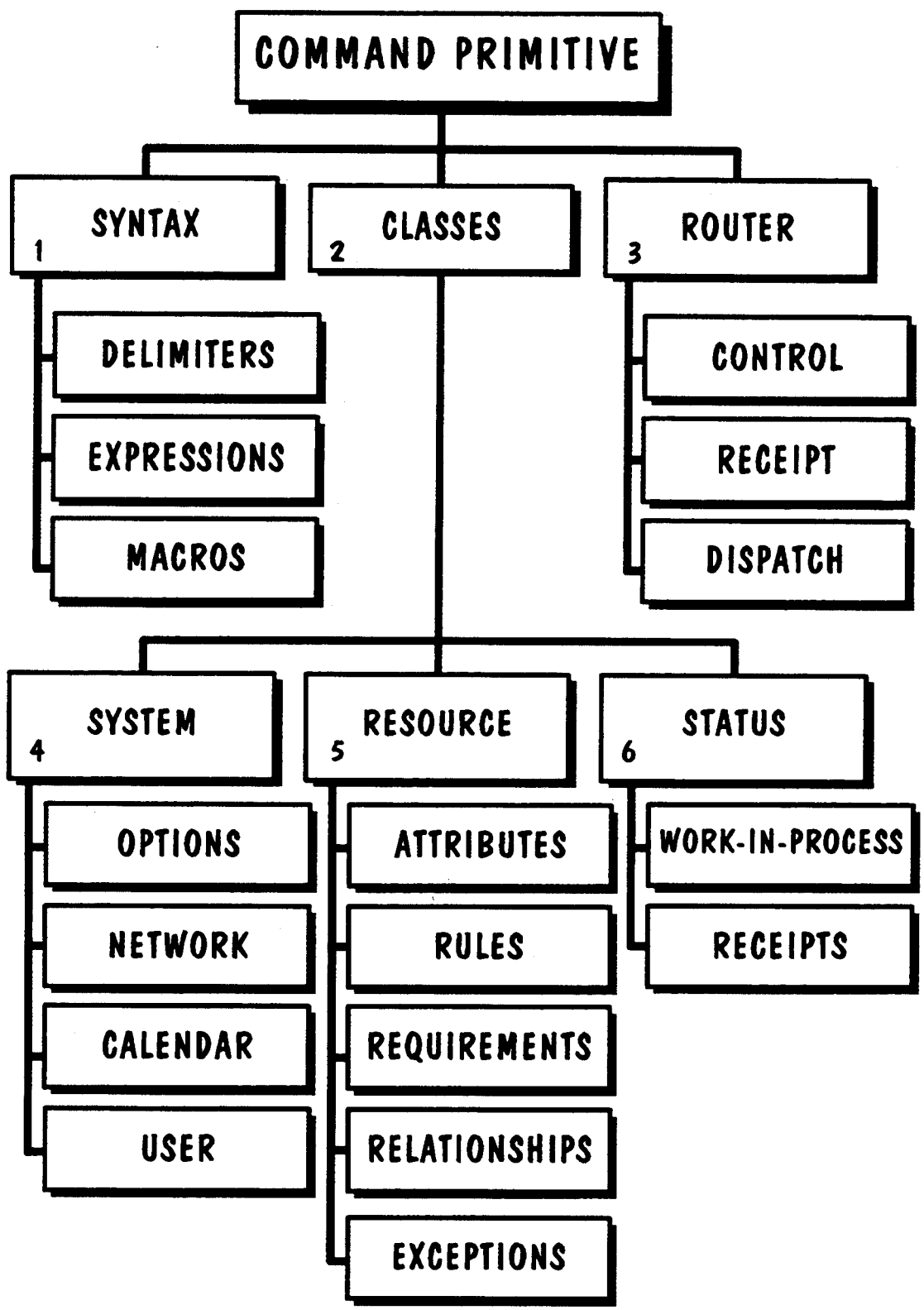
FIG. 12 is a chart illustrating the arrangement of component parts used to define, transmit, and interpret command primitives.

FIG. 12 illustrates a preferred embodiment of command primitives required for the distributed operation of a resource management system. Examples of syntax have been used in the description of resource engine and action control operation, only the method of primitive construction is described herein.

Within the context of the present invention, command primitives are a method for defining system characteristics, resources, their relationships, rules of constraint, and status. A syntax is required to express these facts, and macros to express commonly used phrases.

A translation method (parser) for key words & values is required. An essential element of translation is the conversion of "external" (parts, models, work-centers, order numbers, etc.) to "internal" references such as Resource Identification (RID).

Methods are divided into classes as follows:
1. SYSTEM primitives maintain tables which are "Non-Resource" specific. This includes the definition of users, calendars, units conversion, and messages between users.
2. RESOURCE primitives maintain information about a resource. Descriptive information includes the identification of the assigned user (planner, purchasing agent, or other decision maker), calendar, text description, units of measure, and definition of dependent resource requirements, and exceptions.
3. STATUS primitives maintain information about work in process.

The invention has been described in detail with reference to the preferred embodiments thereof. However it should be appreciated that those skilled in the art, upon consideration of the disclosure and drawings, may make modifications and improvements within the spirit and scope of the invention defined in the following claims.

I claim

1. A method for continuous resource management of events for a multitude of predetermined heterogenous resources with complex interrelationships by scheduling and controlling actions, said method comprising:
   (a) providing memory for permanent and temporary data files;
   (b) providing a resource engine for each predetermined resource for continuously performing prospective scheduling;
   (c) providing an action control for each management function;
   (d) providing a router;
   (e) providing a processing unit for operating the resource engine, the action control and the router;
   (f) providing into the memory information about each resource comprising resource characteristics, rules for resource use, and relationships with other resources for permanent data files;
   (g) initializing the resource engine with independent demand and current conditions;
   (h) continuously monitoring with the resource engine changes in independent demand and conditions using data from external agents and providing instructions to an action control; and
   (i) using the action control to determine actions to be taken based on resource information and changes and providing instructions to a resource engine;

(j) the router managing, logging and certifying delivery of instructions from and between resource engines, action controls, and external agents;
wherein the temporary data files are used by the resource engine and the action control to store temporary data.

2. The method for continuous resource management according to claim 1, wherein data integrity of the resource engine is monitored by the steps of:
   (a) initializing control information;
   (b) providing an audit history and control information;
   (c) evaluating the audit history and control information to determine the state of processing for the resource engine; and
   (d) generating instructions to correct dependent demand event errors.

3. The method for continuous resource management according to claim 1, wherein the resource engine performs prospective scheduling by the steps of
   (a) processing command primitive message syntax, macros and keywords either to change system control tables or to create internal transactions;
   (b) determining a sequence in which resource processing is performed;
   (c) combining descriptions of dependent changes and parent demand changes to determine dependent demand changes;
   (d) updating resource demands, rules and status;
   (e) balancing supply and demand events;
   (f) defining dependent changes; and
   (g) defining a time trigger.

4. The method for continuous resource management according to claim 1, wherein the resource engine determines when a resource condition will change by the steps of:
   (a) initializing an ordered time trigger list;
   (b) providing a time trigger for each resource when evaluated;
   (c) providing under cooperative control a periodic check for any resource time trigger less than present time for addition to a list of resources to be processed; and
   (d) regenerating the ordered time trigger list.

5. A method for continuous resource management according to claim 1, wherein the resource engine adjusts supply order timing by the steps of:
   (a) aligning supply events within intervals as defined by alignment parameters;
   (b) adjusting supply event time to earlier intervals to satisfy rules for resource use; and
   (c) determining when available capacity is exceeded.

6. A method for continuous resource management according to claim 1, wherein the resource engine provides precise lead time offset modeling by a method comprising the steps of:
   (a) determining a lead time transform either by evaluating routings, overlaps and complex factors, and historical process data or by explicitly defining a lead time transform; and
   (b) determining dependent demand amounts from parent supply amount by said transform.

7. A method for continuous resource management according to claim 1, wherein the resource engine provides precise conversion between parent supply and dependent demand amount by a method comprising the steps of:
   (a) establishing dependent amount formulas and coefficients;
   (b) determining conversion factor and option values by formula or explicit definition; and
   (c) determining dependent demand amount from parent supply amount, factor and option values.

8. A method for continuous resource management according to claim 1, wherein the resource engine creates and changes dependent demands by a method further comprising:
   (a) providing a transaction defining the parent to dependent relationship;
   (b) providing a reference to parent supply events; and
   (c) combining said transaction with every supply event.

9. The method for continuous resource management according to claim 1, wherein the action control further provides means for managing actions in a timely manner by a method comprising:
   (a) receiving notification of an action item that requires a response;
   (b) providing a list of action items arranged by user defined priorities;
   (c) providing a detail schedule of events that identifies sources of requirements;
   (d) determining alternative solutions for each selected action item;
   (e) producing changes required for a chosen solution;
   (f) taking action automatically as specified in user defined options;
   (g) reminding an user of any deferred action;
   (h) Focusing and directing analysis based upon previous context; and
   (i) communicating with other users by messages that automatically generate context and problem analysis references.

10. A method for continuous resource management according to the method of claim 1, further comprising providing multiple rule sets on a common time horizon creating resource supply events that provide both near horizon details and far horizon summary information.

11. A method for continuous resource management according to claim 1, wherein the resource engine combines capacity and materials management by a method comprising the steps of:
    (a) defining resource schedule events;
    (b) balancing resource supply and demand; and
    (c) converting between diverse resource units of measurement.

12. A method for continuous resource in accord with the method of claim 1, the method further comprising providing concurrent inquiry and update of schedule information while maintaining data consistency, integrity, and fault tolerance.

* * * * *